(12) United States Patent
Madigan et al.

(10) Patent No.: US 11,235,394 B2
(45) Date of Patent: *Feb. 1, 2022

(54) PHOTODETECTOR ARRAY FOR ADDITIVE MANUFACTURING OPERATIONS

(71) Applicant: Sigma Labs, Inc., Santa Fe, NM (US)

(72) Inventors: R. Bruce Madigan, Butte, MT (US); Mark J. Cola, Santa Fe, NM (US); Scott Betts, Santa Fe, NM (US); Darren Beckett, Corrales, NM (US); Alberto M. Castro, Santa Fe, NM (US); Lars Jacquemetton, Santa Fe, NM (US); Martin Piltch, Los Alamos, NM (US)

(73) Assignee: SIGMA LABS, INC., Santa Fe, NM (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/003,330

(22) Filed: Aug. 26, 2020

(65) Prior Publication Data

US 2021/0046546 A1    Feb. 18, 2021

Related U.S. Application Data

(63) Continuation of application No. 16/282,016, filed on Feb. 21, 2019, now Pat. No. 10,786,850.
(Continued)

(51) Int. Cl.
*B22F 3/105*       (2006.01)
*B33Y 10/00*       (2015.01)
(Continued)

(52) U.S. Cl.
CPC ............. *B22F 12/00* (2021.01); *B22F 10/00* (2021.01); *B23K 26/032* (2013.01);
(Continued)

(58) Field of Classification Search
CPC ..... B29C 64/00; B29C 64/393; B23K 26/032; B23K 26/342; B23K 26/03;
(Continued)

(56) References Cited

U.S. PATENT DOCUMENTS 5,552,575 A    9/1996 Doumanidis
6,055,060 A    4/2000 Bolduan et al.
(Continued)

FOREIGN PATENT DOCUMENTS

CN    1135732 A    11/1996
CN    1976800 A    6/2007
(Continued)

OTHER PUBLICATIONS

Bockh, et al., "Wärmeübertragung", Grundlagen und Praxis, Springer, 2014, 322 pages.
(Continued)

*Primary Examiner* — Sang H Nguyen
(74) *Attorney, Agent, or Firm* — Kilpatrick Townsend & Stockton LLP

(57) ABSTRACT

This disclosure describes an additive manufacturing system that includes a build plane having a first region and a second region. Multiple energy source can be positioned above the build plane and configured to direct energy into the first and second regions of the build plane. The system includes optical sensors configured to monitor an intensity of light emitted from the energy sources. A processor associated with the additive manufacturing system is configured to adjust the sensor outputs in response to the energy sources coming into close proximity.

20 Claims, 26 Drawing Sheets

Related U.S. Application Data

(60) Provisional application No. 62/633,496, filed on Feb. 21, 2018, provisional application No. 62/643,457, filed on Mar. 15, 2018, provisional application No. 62/633,487, filed on Feb. 21, 2018.

(51) Int. Cl.

| | | |
|---|---|---|
| *B33Y 30/00* | (2015.01) | |
| *B33Y 50/02* | (2015.01) | |
| *B23K 26/06* | (2014.01) | |
| *B23K 26/082* | (2014.01) | |
| *B23K 26/342* | (2014.01) | |
| *B23K 26/03* | (2006.01) | |
| *B29C 64/00* | (2017.01) | |
| *B22F 12/00* | (2021.01) | |
| *B22F 10/00* | (2021.01) | |
| *B22F 10/10* | (2021.01) | |

(52) U.S. Cl.
CPC ...... *B23K 26/0608* (2013.01); *B23K 26/0626* (2013.01); *B23K 26/082* (2015.10); *B23K 26/342* (2015.10); *B29C 64/00* (2017.08); *B33Y 10/00* (2014.12); *B33Y 30/00* (2014.12); *B33Y 50/02* (2014.12); *B22F 10/10* (2021.01)

(58) Field of Classification Search
CPC .............. B23K 26/0626; B23K 26/082; B23K 26/0608; B22F 10/30; B22F 10/20; B22F 10/00; B22F 10/10; B22F 12/00; B33Y 50/02; B33Y 10/00; B33Y 30/00; Y02P 10/25

See application file for complete search history.

(56) References Cited

U.S. PATENT DOCUMENTS

| | | | |
|---|---|---|---|
| 6,313,913 B1 | 11/2001 | Nakagawa et al. | |
| 6,707,554 B1 | 3/2004 | Miltner et al. | |
| 7,515,986 B2 | 4/2009 | Huskamp | |
| 8,137,739 B2 | 3/2012 | Philippi et al. | |
| 9,254,682 B2* | 2/2016 | Duke | B41J 11/008 |
| 9,533,375 B2 | 1/2017 | Cho et al. | |
| 9,925,715 B2 | 3/2018 | Cheverton et al. | |
| 10,207,363 B2 | 2/2019 | Craig et al. | |
| 2003/0234239 A1 | 12/2003 | Lee et al. | |
| 2004/0164165 A1 | 8/2004 | Havens et al. | |
| 2004/0200816 A1 | 10/2004 | Chung et al. | |
| 2004/0247170 A1 | 12/2004 | Furze et al. | |
| 2007/0276187 A1* | 11/2007 | Wiklof | A61B 1/00096 600/182 |
| 2008/0273758 A1 | 11/2008 | Fuchs et al. | |
| 2009/0268029 A1 | 10/2009 | Haussmann et al. | |
| 2010/0249979 A1 | 9/2010 | John et al. | |
| 2010/0256945 A1 | 10/2010 | Murata | |
| 2011/0254811 A1 | 10/2011 | Lawrence et al. | |
| 2012/0283712 A1 | 11/2012 | Youngquist et al. | |
| 2012/0287443 A1 | 11/2012 | Lin et al. | |
| 2012/0327428 A1 | 12/2012 | Hellwig et al. | |
| 2013/0105447 A1 | 5/2013 | Haake | |
| 2014/0314613 A1 | 10/2014 | Hopkinson et al. | |
| 2015/0048058 A1 | 2/2015 | Bruck et al. | |
| 2015/0268099 A1 | 9/2015 | Craig et al. | |
| 2016/0096236 A1 | 4/2016 | Cho et al. | |
| 2016/0151859 A1 | 6/2016 | Sparks | |
| 2016/0185048 A1 | 6/2016 | Dave et al. | |
| 2016/0228987 A1 | 8/2016 | Baudimont et al. | |
| 2016/0236279 A1 | 8/2016 | Ashton et al. | |
| 2016/0347005 A1 | 12/2016 | Miller | |
| 2017/0016781 A1 | 1/2017 | Dave et al. | |
| 2017/0090462 A1 | 3/2017 | Dave et al. | |
| 2017/0102689 A1 | 4/2017 | Khajepour et al. | |
| 2017/0131388 A1* | 5/2017 | Campbell | G01S 7/4812 |
| 2017/0151628 A1 | 6/2017 | Craig et al. | |
| 2017/0217104 A1 | 8/2017 | Cortes I Herms et al. | |
| 2017/0266762 A1 | 9/2017 | Dave et al. | |
| 2017/0334144 A1 | 11/2017 | Fish et al. | |
| 2017/0368640 A1 | 12/2017 | Herzog et al. | |
| 2018/0020207 A1 | 1/2018 | Sugimura et al. | |
| 2018/0169948 A1 | 6/2018 | Coeck et al. | |
| 2018/0186079 A1 | 7/2018 | Vilajosana et al. | |
| 2018/0229303 A1 | 8/2018 | Burlatsky et al. | |
| 2018/0281286 A1 | 10/2018 | Vilajosana et al. | |
| 2018/0345649 A1 | 12/2018 | Prakash | |
| 2019/0009463 A1 | 1/2019 | Vilajosana et al. | |
| 2019/0022946 A1 | 1/2019 | Jones et al. | |
| 2019/0039318 A1 | 2/2019 | Madigan et al. | |
| 2019/0047226 A1 | 2/2019 | Ishikawa et al. | |
| 2019/0095555 A1 | 3/2019 | Lopez et al. | |
| 2019/0118300 A1 | 4/2019 | Penny et al. | |
| 2019/0217416 A1 | 7/2019 | Brochu | |
| 2020/0064289 A1 | 2/2020 | Huang et al. | |
| 2021/0078076 A1 | 3/2021 | Jurg et al. | |

FOREIGN PATENT DOCUMENTS

| | | |
|---|---|---|
| CN | 201915148 U | 8/2011 |
| CN | 104470703 A | 3/2015 |
| CN | 104640667 A | 5/2015 |
| CN | 105058788 A | 11/2015 |
| CN | 105499569 A | 4/2016 |
| CN | 106794605 A | 5/2017 |
| CN | 107107481 A | 8/2017 |
| CN | 111107974 A | 5/2020 |
| DE | 102009015282 A1 | 10/2010 |
| DE | 102016011801 A1 | 4/2018 |
| EP | 3127635 A1 | 2/2017 |
| EP | 3527352 A1 | 8/2019 |
| WO | 2015121730 A1 | 8/2015 |
| WO | 2016050319 A1 | 4/2016 |
| WO | 2017071741 A1 | 5/2017 |
| WO | 2018087556 A1 | 5/2018 |

OTHER PUBLICATIONS

DE112018001597.1, "Notice of Decision to Grant", dated Feb. 25, 2021, 9 pages.
DE112019000498.0, "Office Action", dated Mar. 2, 2021, 9 pages.
EP18840578.1, "Office Action", dated Mar. 12, 2021, 5 pages.
KR10-2020-7005720, "Office Action", dated Mar. 8, 2021, 6 pages.
U.S. Appl. No. 16/052,488, "Ex Parte Quayle Action", Dec. 20, 2018, 6 pages.
U.S. Appl. No. 16/052,488, "Non-Final Office Action", dated May 1, 2019, 17 pages.
U.S. Appl. No. 16/052,488, "Notice of Allowance", dated Aug. 9, 2019, 6 pages.
U.S. Appl. No. 16/282,004, "Non-Final Office Action", dated Nov. 8, 2019, 16 Pages.
U.S. Appl. No. 16/282,004, "Notice of Allowance", dated Mar. 9, 2020, 14 pages.
U.S. Appl. No. 16/282,016, "Final Office Action", dated Feb. 21, 2020, 16 pages.
U.S. Appl. No. 16/282,016, "Non-Final Office Action", dated Sep. 3, 2019, 14 pages.
U.S. Appl. No. 16/282,016, "Notice of Allowance", dated May 27, 2020, 9 pages.
DE112018001597.1, "Office Action", dated Jul. 15, 2020, 6 pages.
EP18840578.1, "Extended European Search Report", dated Nov. 5, 2019, 8 pages.
PCT/US2018/044884, "International Preliminary Report on Patentability", dated Feb. 13, 2020, 7 pages.
PCT/US2018/044884, "International Search Report and Written Opinion", dated Oct. 15, 2018, 8 pages.
PCT/US2019/019009, "International Preliminary Report on Patentability", dated Sep. 3, 2020, 6 pages.
PCT/US2019/019009, "International Search Report and Written Opinion", dated May 8, 2019, 7 pages.
PCT/US2019/019016, "International Preliminary Report on Patentability", dated Sep. 3, 2020, 7 pages.

(56) References Cited

OTHER PUBLICATIONS

PCT/US2019/019016, "International Search Report and Written Opinion", dated May 16, 2019, 8 pages.
CN201880064101.1, "Office Action", dated Jul. 5, 2021, 15 pages.
CN201980027059.0, "Office Action", dated Jun. 11, 2021, 8 pages.
DE112019000521.9, "Office Action", dated Jun. 25, 2021, 3 pages.
JP2020-529102, "Office Action", dated Apr. 30, 2021, 14 pages.
U.S. Appl. No. 16/574,388, "Non-Final Office Action", dated Nov. 19, 2021, 9 pages.

* cited by examiner

| Photodiode | Angle (deg) | Voltage Response |
|---|---|---|
| A | 0 | 129 |
| | 30 | 120 |
| | 45 | 105 |
| | 55 | 74 |
| | 65 | 34 |
| C | 0 | 135 |
| | 15 | 135 |
| | 25 | 130 |
| | 35 | 123 |
| | 50 | 105 |
| | 60 | 70 |
| | 65 | 19 |

PHOTODETECTOR ARRAY FOR ADDITIVE MANUFACTURING OPERATIONS

CROSS-REFERENCES TO RELATED APPLICATIONS

This application is a continuation of U.S. patent application Ser. No. 16/282,016, filed Feb. 21, 2019; which claims priority to U.S. Provisional Patent Application No. 62/633,496, filed on Feb. 21, 2018, to U.S. Provisional Patent Application No. 62/643,457 filed on Mar. 15, 2018, and to U.S. Provisional Patent Application No. 62/633,487, filed on Feb. 21, 2018. The disclosures of which are hereby incorporated by reference in their entirety for all purposes.

BACKGROUND

Additive manufacturing, or the sequential assembly or construction of a part through the combination of material addition and applied energy, takes on many forms and currently exists in many specific implementations and embodiments. Additive manufacturing can be carried out by using any of a number of various processes that involve the formation of a three dimensional part of virtually any shape. The various processes have in common the sintering, curing or melting of liquid, powdered or granular raw material, layer by layer using ultraviolet light, high powered laser, or electron beam, respectively. Unfortunately, established processes for determining a quality of a resulting part manufactured in this way are limited. Conventional quality assurance testing generally involves destruction of the part. While destructive testing is an accepted way of validating a part's quality, as it allows for close scrutiny of various internal portions of the part, such tests cannot for obvious reasons be applied to a production part. Consequently, ways of non-destructively verifying the integrity of a part produced by additive manufacturing is desired.

SUMMARY OF THE INVENTION

This disclosure describes various embodiments that relate to ways in multiple sensor devices can cooperatively monitor an additive manufacturing process.

By arranging multiple photodetectors around a central region of an additive manufacturing system, the photodetectors, which can take the form of photodiodes, phototransistors or photo-resistors, can be configured to cooperatively monitor a build plane of the additive manufacturing system. While numerous different sensor configurations are possible, this disclosure describes a sensor assembly that includes two or more radially dispersed sensor devices. Including numerous sensor devices allows for redundancy and permits higher levels of accuracy to be obtained. Various control methods can be applied to compensate for any variations in distance or angle between the sensor assembly and heated portions of the build plane.

Additional embodiments are described that include the use of both on and off-axis optical sensors to monitor multi-energy source additive manufacturing machines. In particular, various configurations and methods are mentioned that describe ways in which energy applied by multiple energy sources can be accurately monitored.

An additive manufacturing system is disclosed and includes: a build plane having a first region and a second region at least partially overlapping the first region; a first energy source assembly, comprising: a first energy source configured to direct energy along a first path within the first region of the build plane; and a first optical sensor having a first sensor field of view configured to follow the first path and to monitor energy radiated from the build plane; a second energy source assembly, comprising: a second energy source configured to direct energy along a second path within the second region of the build plane; and a second optical sensor having a second sensor field of view configured to follow the second path and to monitor energy radiated from the build plane; and a processor configured to adjust an output of the first and second optical sensors in response to a distance between the first and second paths falling below a threshold distance.

An additive manufacturing method, comprising: scanning a first energy source along a first path traversing a layer of powder positioned upon a build plane; monitoring a first amount of energy radiated from the layer of powder using a first optical sensor having a first sensor field of view that includes at least a portion of the first path; scanning a second energy source along a second path traversing the layer of powder; monitoring a second amount of energy radiated from the layer of powder using a second optical sensor having a second sensor field of view that includes at least a portion of the second path; and adjusting an output of the first and second optical sensors in accordance with a distance between the first and second scanning energy sources.

An additive manufacturing method is disclosed and includes the following: scanning a first energy source along a first path traversing a layer of powder positioned upon a build plane; monitoring a first amount of energy radiated from the layer of powder using a first optical sensor having a first sensor field of view that includes at least a portion of the first path; scanning a second energy source along a second path traversing the layer of powder; monitoring a second amount of energy radiated from the layer of powder using a second optical sensor having a second sensor field of view that includes at least a portion of the second path; and adjusting an output of the first and second optical sensors in accordance with a distance between the first and second scanning energy sources.

Other aspects and advantages of the invention will become apparent from the following detailed description taken in conjunction with the accompanying drawings which illustrate, by way of example, the principles of the described embodiments.

BRIEF DESCRIPTION OF THE DRAWINGS

The disclosure will be readily understood by the following detailed description in conjunction with the accompanying drawings, wherein like reference numerals designate like structural elements, and in which.

DETAILED DESCRIPTION

Figure 1:
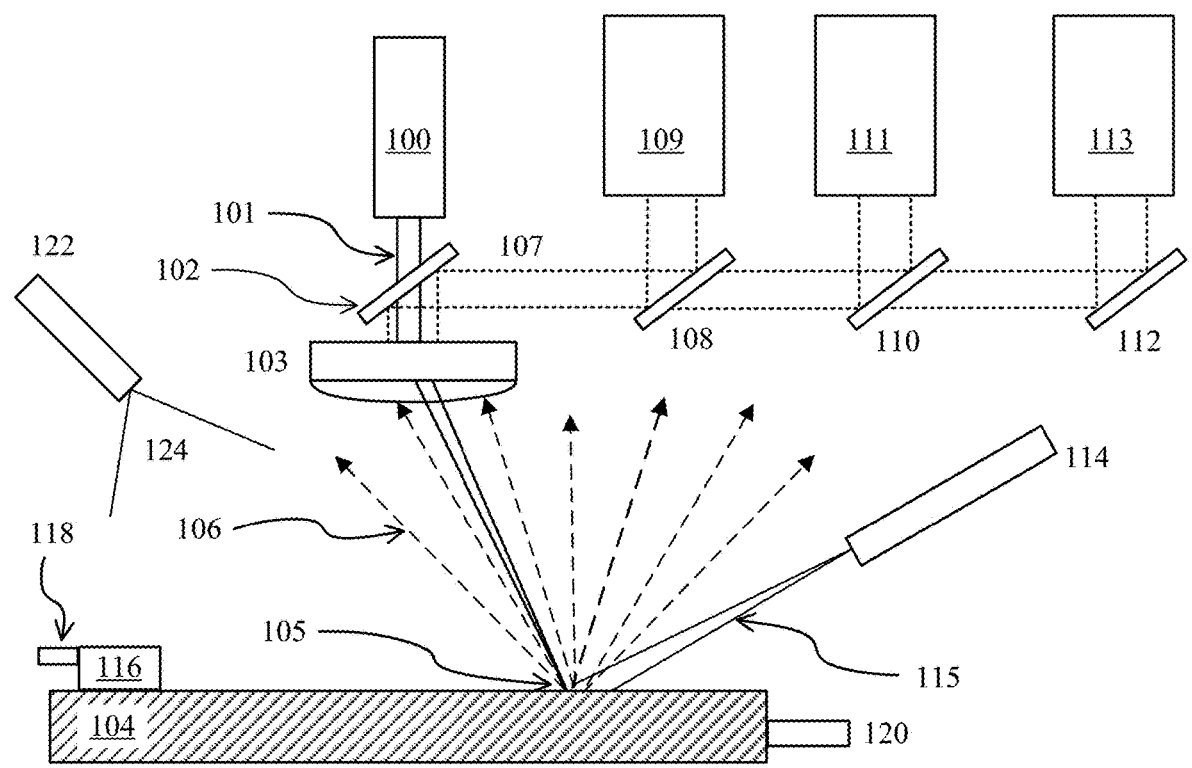
FIG. 1 shows a multi-sensor process sensing system in which a number of sensors receive information from the same optical path.

Representative applications of methods and apparatus according to the present application are described in this section. These examples are being provided solely to add context and aid in the understanding of the described embodiments. It will thus be apparent to one skilled in the art that the described embodiments may be practiced without some or all of these specific details. In other instances, well known process steps have not been described in detail in order to avoid unnecessarily obscuring the described embodiments. Other applications are possible, such that the following examples should not be taken as limiting.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting; such that other embodiments may be used, and changes may be made without departing from the spirit and scope of the described embodiments.

A sensor device, which can take the form of a photodetector, that is configured to monitor an additive manufacturing, welding or cutting operation from a fixed position may miss certain heat emissions taking place during an operation due to a variety of reasons including varying laser scan pattern, part geometry, part location, inconsistent sensor performance, and sensor outages. Part geometry can be detrimental to single sensor operation when producing complex parts that expose a larger surface area of a heated material in one direction than another. This type of geometry can result in an intensity reading that either over or under-represents an amount of heat being detected by a single sensor. Furthermore, when a single sensor configuration ceases operation for even a second or more, temperature excursions could be missed entirely, resulting in a portion of the part being out of specification without the knowledge of the manufacturer. When producing parts that require strict building standards be maintained for part certification, a transient outage for that single sensor could result in disqualification of the part.

For the aforementioned reasons, collecting sensor data from multiple sensor devices located in different positions can help improve accuracy. In order to incorporate multiple sensor devices without introducing additional sources of error, the sensors can be radially distributed about a central region of a build plane. Distributing the sensors in this manner reduces the amount of variation there is in distance between the different sensor devices and various positions of an energy beam emitted by an energy source as it quickly scans across the build plane. The energy source emitting the energy beam can take many forms including a laser, an electron beam, or a plasma arc.

In some embodiments, variations in sensor readings caused by differences in distance and/or angle from the sensor devices to locations on the build plane receiving heat can be resolved by dynamically adjusting the gain of the sensors in accordance with the distance and angle off. Alternatively, or in addition to making changes in gain, the sensor readings can automatically be boosted or lowered based on estimated distance between the sensor and the location emitting heat. In some embodiments, photomultiplier tubes can be used where the intensity of heat emitted by the build plane is expected to be below the sensitivity of a traditional photoreceptor. Generally a photoreceptor can include devices such as photodiodes, pyrometers, phototransistors and photoresistors.

These and other embodiments are discussed below with reference to FIGS. 1-9; however, those skilled in the art will readily appreciate that the detailed description given herein with respect to these figures is for explanatory purposes only and should not be construed as limiting.

FIG. 1 shows a multi-sensor process sensing system in which some sensors receive information from the same optical path. It is instructive to examine precisely in what manner the data can be acquired. In FIG. 1, the intense energy source 100 is in this specific instance taken to be a laser although energy source 100 could also take the form of an electron beam or other powerful energy source. The beam 101 emitted by energy source 100 originates at the laser head and passes through a partially reflective optic 102. This optic 102 is designed to be essentially fully transmissive at the specific wavelength that the laser operates, and reflective at other optical wavelengths. Generally the laser wavelength will be infrared or near-infrared, or typically wavelengths of 1000 nm or greater. The laser can include a scanning head 103 that consists of x and y positioning galvanometers as well as a focus lens, such as an f-theta lens. The beam 101 is therefore focused and strikes the workpiece 104 at a given location 105 thus generating a molten region on the workpiece 104. The heated region results in optical radiation 106 being emitted isotropically and uniformly over a large solid angle. Some of this optical radiation 106 will make its way back through the scanning head 103 and is reflected by the partially reflective optic 102.

This reflected optical beam 107 then makes its way through a series of analytical instruments. A beam splitter 108 sends a portion of the beam to a photodiode 109. While photodiode 109 could also be replaced with other sensor devices such as a pyrometer, photoresistor or phototransistor, a photodiode is used for exemplary purposes. Photodiode 109 can be capable of sensing a range of frequencies at a high enough speed and recording rate to detect possible anomalies occurring during a deposition process, i.e. sudden departures from an average or mean intensity level. The remaining portion of the reflected optical beam 107 then goes to another beam splitter 110 and a portion of this beam is collected by a pyrometer 111. The pyrometer 111 may integrate this signal over some time interval in order to assign a temperature to the light thus collected. The signal should be corrected for the various optical attenuations that have occurred through beam splitting as well as the correction for the remote location of the molten region 105 on the workpiece 104 that resulted in the optical emission 106 of which a portion 107 was collected. Lastly the remaining portion of the reflected optical beam 107 is directed by a mirror 112 into a high speed optical imaging sensor 113 which could be a camera, or some other kind of linear or area CCD array or other imaging array. This optical imaging sensor 113 captures a 1D or 2D image that correlates to the size of the molten region. By using a relatively low resolution sensor 113, sensor 113 can be configured to record data at extremely high frame rates, so that sensor 113 is capable of detecting very transient temperature excursions occurring during a build process.

In addition to the various sensors described above, one or more sensors can be applied to make measurements that are independent of the laser scanning reference frame. This measurement can be used for correlation and calibration purposes. For example in FIG. 1, a stationary pyrometer 114 independently measures the temperature and therefore provides a calibration to the measurement made by pyrometer 111. The field of view 115 of the stationary Eulerian pyrometer 114 is suitably chosen so that it matches the characteristic dimension of the molten zone 105 existing on the workpiece 104 and made by the focused laser beam 101 at the specific location to which the scanning head 103 displaced and focused the beam 101.

In addition to the aforementioned sensors, additional sensors can be added to enhance measurements taken by the additive manufacturing sensor system. Device 116 can be a part of a mechanism that distributes layers of powder across a top surface of workpiece 104. Device 116 can include a contact sensor 118 that is configured to measure any disruptions to the spreading of the powder such as vibrations or jolts likely to result in an uneven application of the powder. In some embodiments, sensing of a vibration of device 116 can be used to accurately predict changes to the powder layer. The depicted sensing system can also include an acoustic sensor 120. Acoustic sensor 120 can be arranged along one side of the build platform so that as workpiece 104 is built up, acoustic sensor 120 can be configured to listen for the formation of micro-cracks within workpiece 104. Acoustic sensor 120 can be calibrated to determine various characteristics of micro-cracking within workpiece 104. Micro-cracking can be caused from many things but in particular from improper cooling rates. FIG. 1 also shows a photodiode 122 having a field of view 124, which can be configured to detect temperature changes in substantially any portion of the top surface of workpiece 104. In some embodiments, pyrometer 114 can be configured to provide calibration information to photodiode 122, thereby allowing photodiode 122 to accurately distinguish the temperature of any point on the top surface of workpiece 104.

Figure 2:
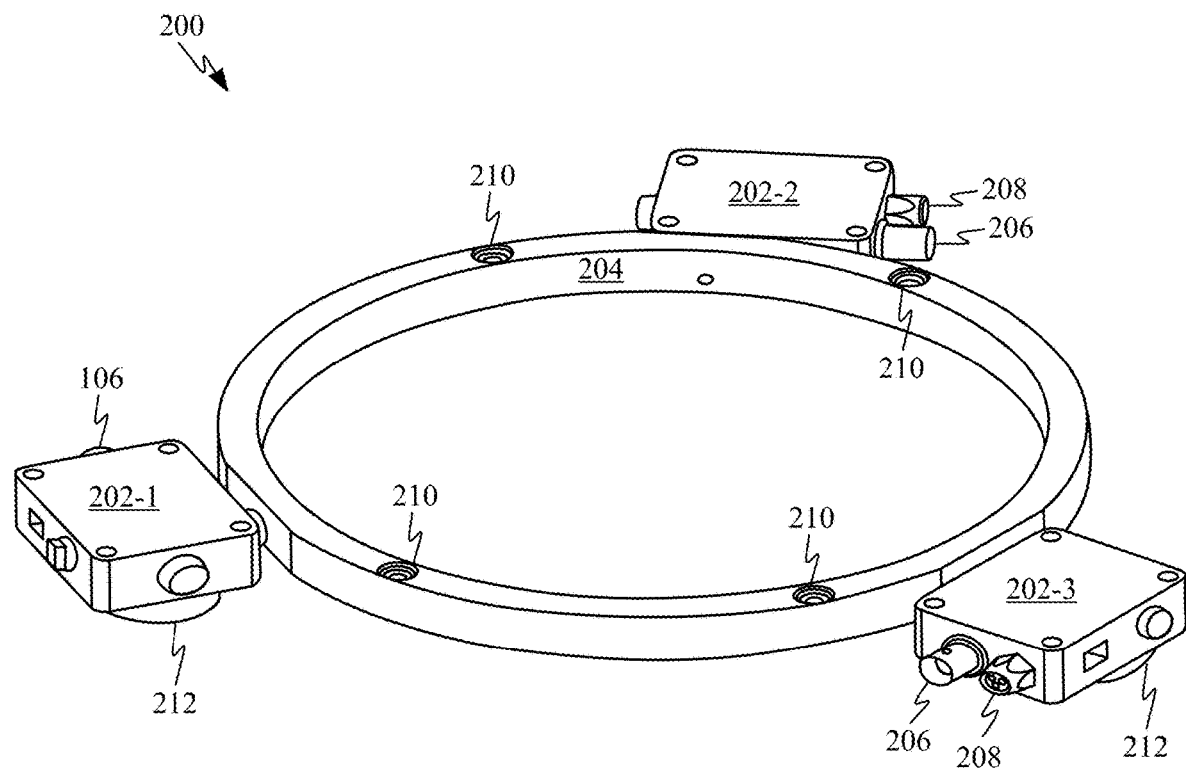
FIG. 2 shows a perspective view of a sensor assembly for an additive manufacturing system, which includes multiple sensor devices distributed around a support ring.

FIG. 2 shows a sensor assembly 200 for an additive manufacturing system, which includes multiple sensor devices 202 distributed around a support ring 204. In some embodiments, support ring 204 can have a diameter of about 180 mm; however, this size could vary to accommodate a size and/or shape of a particular additive manufacturing system. Each of sensor devices 202 can take the form of a photoreceptor configured to monitor an intensity of heat radiated during an additive manufacturing operation. Sensor devices 202 can include input and output ports 206 and 208 for receiving operating instructions and/or transmitting sensor readings. Support ring 204 can include multiple openings 210 for securing support ring 204 to various manufacturing components. Securing support ring 204 in place keeps sensor devices 202 from moving during an additive manufacturing operation. In some embodiments, sensor devices 202 can be mounted to support ring 204 in a manner that accommodates reorientation of each of sensor devices 202 so that a field of view of each of sensor devices 202 can be fine-tuned so that the fields of view of sensor devices 202 align and are substantially overlapping. In some embodiments, each of sensor devices 202 can include tunable optics 212 that are configured to limit the field of view. Tunable optics 212 can be helpful in limiting thermal radiation to a particular area of the build plane as well as helping to keep the fields of view of each of sensor devices 202 aligned. In some embodiments, each of the fields of view of sensor devices 202 can be focused on the same point on the build plane to help in alignment of the field of view. In some embodiments, one or more sensor devices 202 can be configured to monitor multiple frequency ranges. Because sensors 202 do not share the same optics as the energy source the range of frequencies monitored by sensor devices 202 can be optimized to monitor frequencies in the infrared range that vary between about 1250-1800 nm. This can be particularly helpful as sharing optics with the energy source could limit the frequency collected primarily to the visible light spectrum.

While FIG. 2 only depicts three sensor devices 202 a larger or smaller number of sensors is also possible. For example, two sensors could be positioned on opposing sides of support ring 204. Similarly a larger number of sensor devices 202 could be arranged at a smaller radial interval. In some embodiments, two sensors configured to monitor different frequency ranges of light could be collocated. By comparing sensor data collected from two or more different wavelengths of light collected by the collocated sensors, absolute temperature of a heated region of the build plan can be determined since the comparison allows for variations in emissivity to be ignored. In some embodiments, a sensor device 202 can include two separate sensors within a single housing allowing for closer spatial positioning of the sensors. In some embodiments, there may only be one set of collocated sensors that monitor different frequency ranges. This type of configuration could allow the temperatures identified by the collocated sensors to be used to calibrate other sensors.

Support ring 204 can also vary in shape. For example, with a three sensor configuration support ring 204 could be triangular in shape and in some embodiments take the form of an equilateral triangle to precisely distribute each of sensor devices 202 120 degrees from adjacent sensor devices 202. Similarly, support ring 204 could also take the form of a square suitable for supporting a four sensor configuration or take any other polygonal or symmetric shape that supports a substantially regular radial distribution of sensor devices 202. In some embodiments support ring can take the form of a concave support surface with sensor mounts that would allow for the placement of sensor devices 202 around a periphery of the concave support surface and/or distributed across the concave surface. In this way, sensor devices 202 could be placed at slightly different heights while maintaining a fixed position from a central portion of a build plane.

Figure 3:
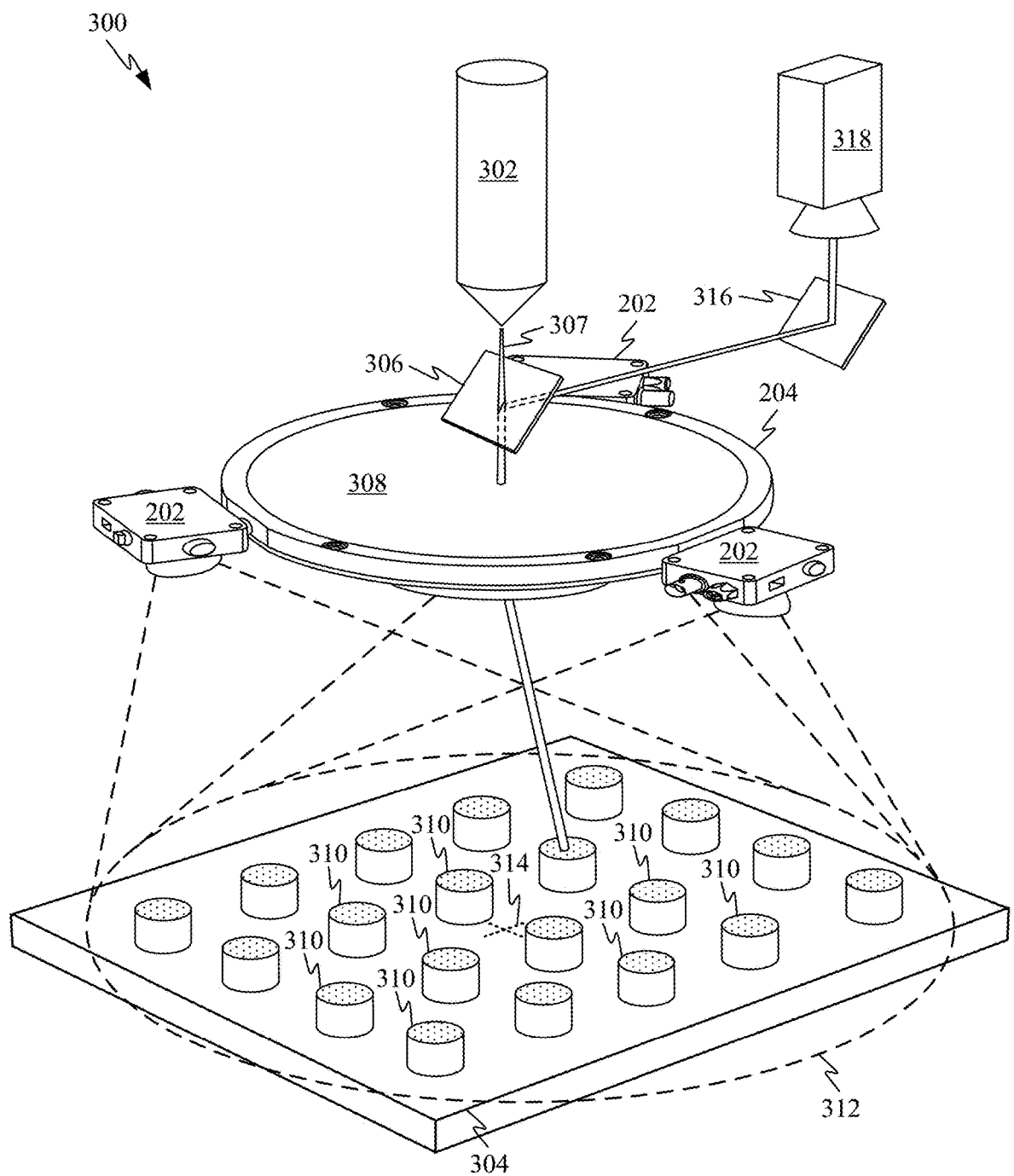
FIG. 3 shows a perspective view of an exemplary additive manufacturing system.

FIG. 3 shows an exemplary additive manufacturing system 300. Energy emitted by energy source 302 can be directed to build plane 304 through partially reflective mirror 306 and steerable optics 308. Partially reflective mirror 306 can be configured to allow an energy beam 307 emitted by energy source 302 to pass through mirror 306 without substantially attenuating the energy. Steerable optics 308 can be configured to quickly maneuver the energy beam emitted by energy source 302 across build plane 304 to generate workpieces 310. Sensor devices 202 of sensor assembly 200 can be positioned and oriented so that all of sensor devices 202 substantially share field of view 312, which can be centered at position 314. Heat radiated from the energy beam incident to workpieces 310 can be detected by both sensor devices 202 and sensor 318, which receives the radiated heat through steering optics 308 partially reflective mirror 306 and mirror 316. It should be noted that any additive manufacturing process performed on build plane 304 can be monitored by sensor devices 202 and/or sensor 318 depending on the type and detail of monitoring desired. In some embodiments, an average of the two closest sensor values can be used when large variations in sensor readings are encountered. In some cases, large transients from a single sensor can be investigated during or after part production as this could be indicative of a thermal transient only seen by one sensor. Where an emission profile is well known analysis may rely on a single or minority portion of the sensors when those sensors are most likely to characterize the amount of energy being input into a workpiece.

Figure 4A:
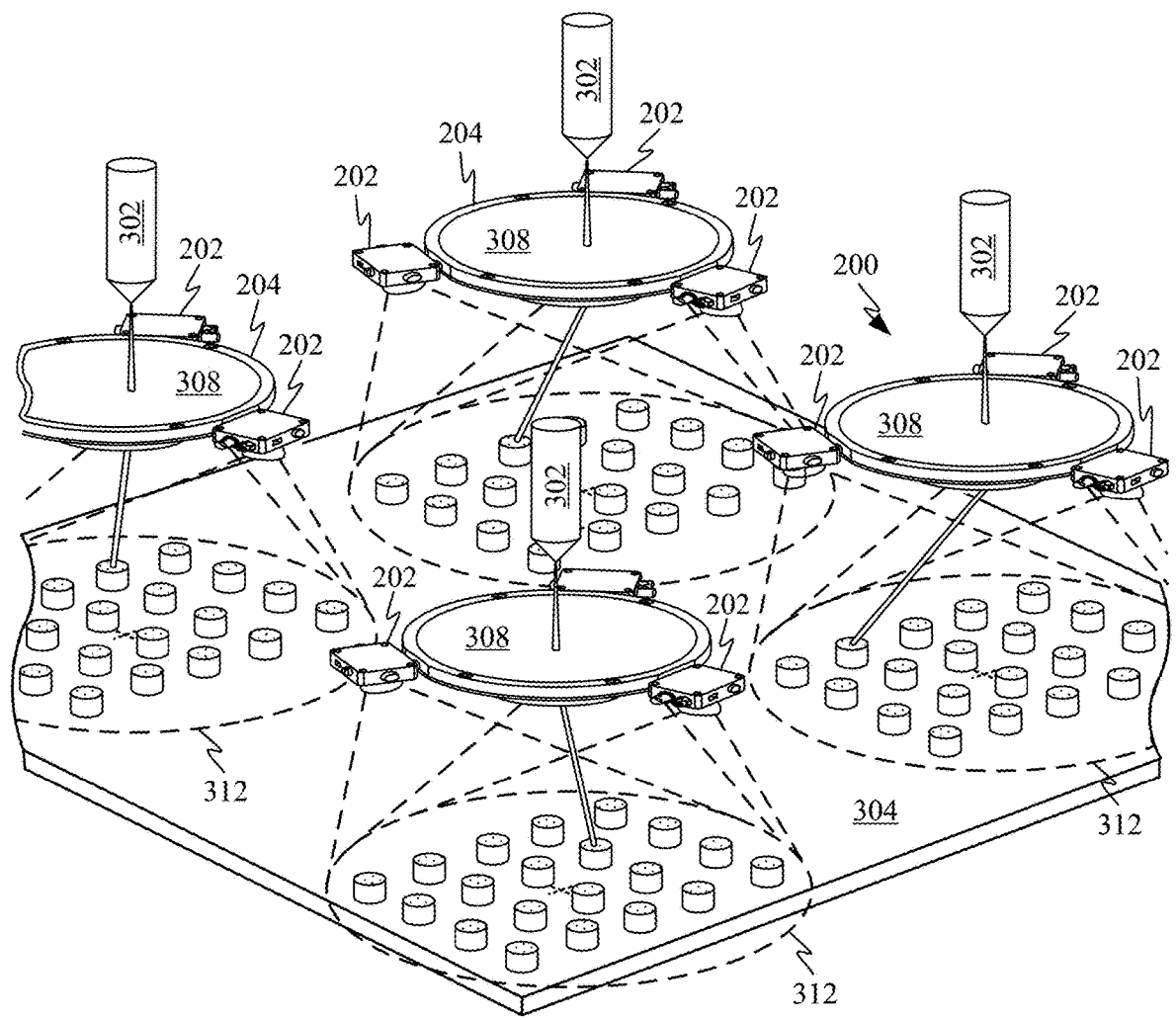
FIG. 4A shows how an additive manufacturing system can include a single build plane large enough to support multiple energy sources and associated sensor assemblies.

FIG. 4A shows how an additive manufacturing system can include a single build plane 304 large enough to support multiple energy sources 302 and associated sensor assemblies 200. Optics associated with sensor devices 202 of each of sensor assemblies 200 can shape the field of view of each of sensor devices 202 to prevent heat radiated from an adjacent field of view 312 from being detected by sensor devices 202 of that sensor assembly 200. In some embodiments, fields of view 312 associated with each of sensor devices 202 can be separated from each other by a gap that also helps prevent heat from adjacent energy sources 302 from being sensed by the wrong sensor assembly 200. In some embodiments, where a path of travel of the energy emitted by one or more of energy sources 302 is known and there is overlap between adjacent fields of view 312 overlapping coverage in adjacent sensor fields of view can be deconflicted by time. For example, when an energy source operates within an overlapping region operation of the other energy source could be halted to prevent detection of multiple energy source. In some embodiments, sensors from two or more different sensor assemblies with overlapping footprints 312 could be utilized to improve characterization of operation of an energy source scanning through the overlapping portion of footprints 312. In some embodiments, a single sensor assembly 200 could be associated with multiple energy sources 302. In such a configuration, different deconfliction methods could be used.

Figure 4B:
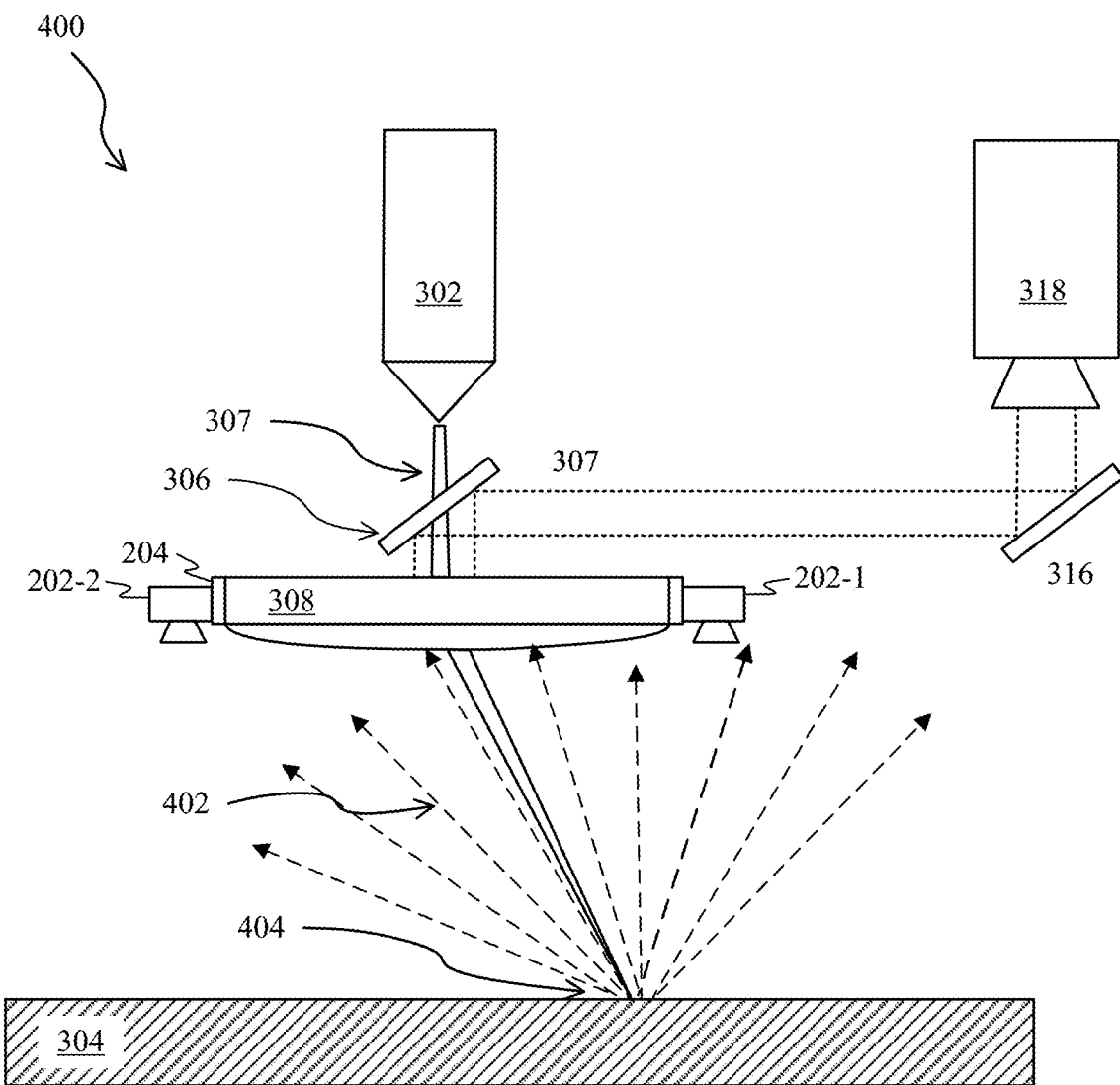
FIG. 4B shows a side view of an additive manufacturing system.

FIG. 4B shows a side view of an additive manufacturing system 400. In particular, FIG. 4B shows how energy 402 emitted from region 404 of build plane 304 is able to reach both sensor devices 202 and sensor 318. However, since sensor device 202-1 is closer than sensor device 202-2 and nearly directly above region 404, sensor readings may be stronger for sensor device 202-1 than sensor device 202-2. This variation can be accounted for in numerous ways that will be described below.

Figure 5A:
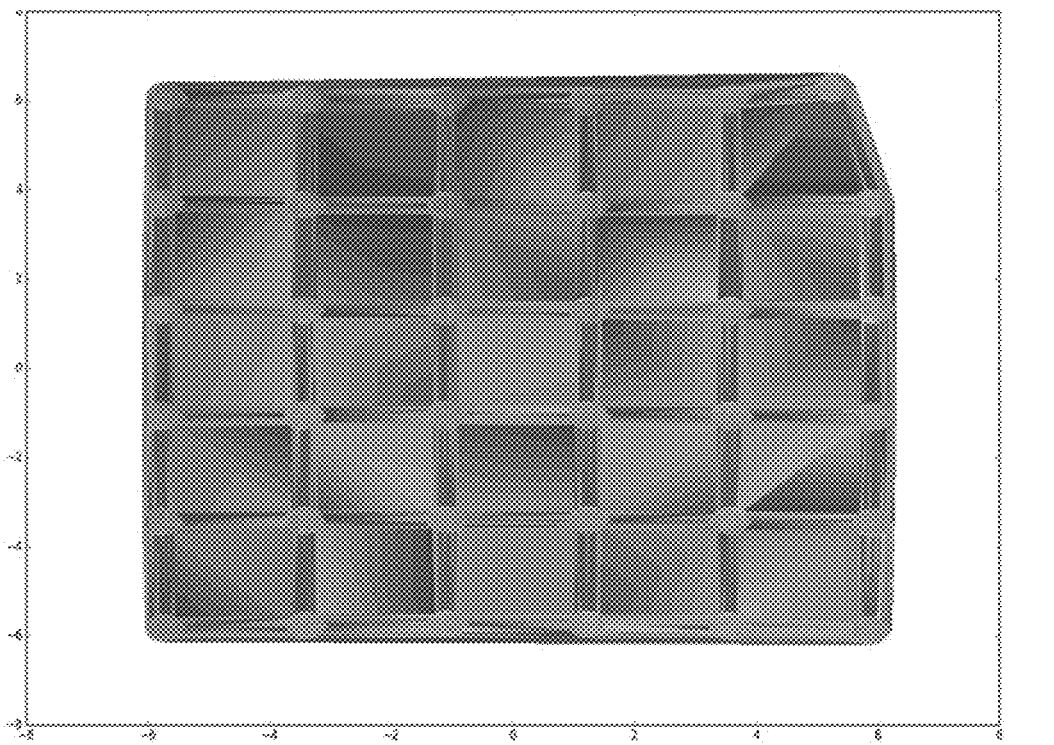
FIGS. 5A-5C each show a top view of a build plane and are shaded to show variations in signal readings recorded by three sensors of a sensor assembly arranged in a configuration similar to the configuration shown in FIG. 2.
Figure 5B:
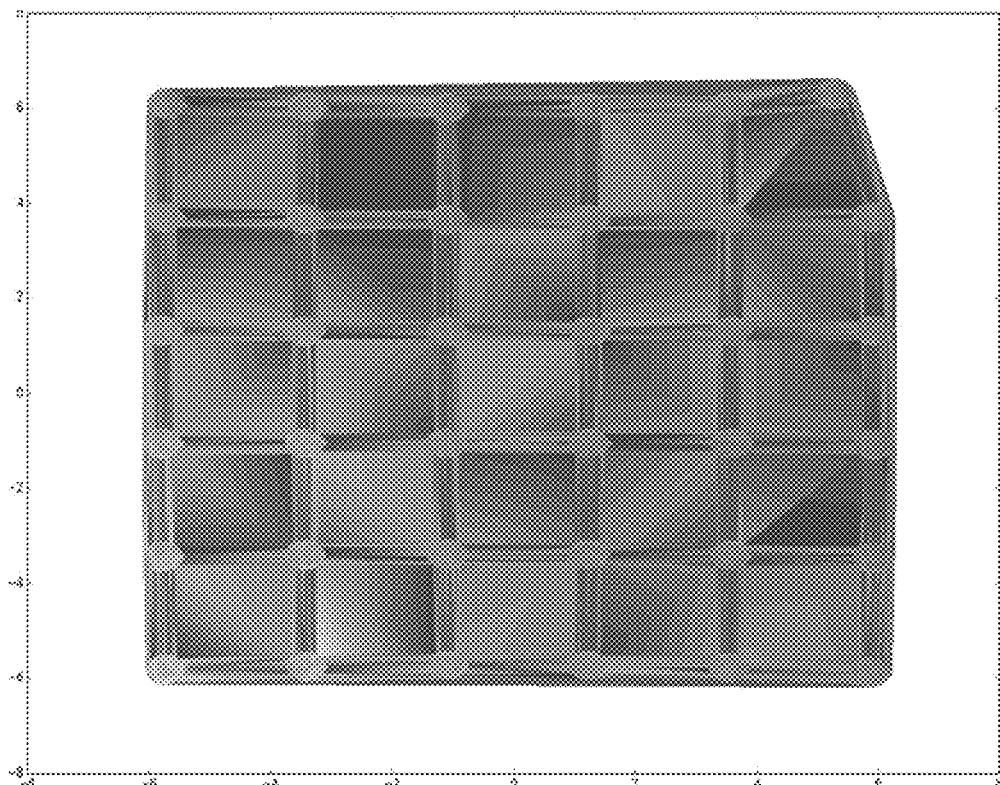
Figure 5C:
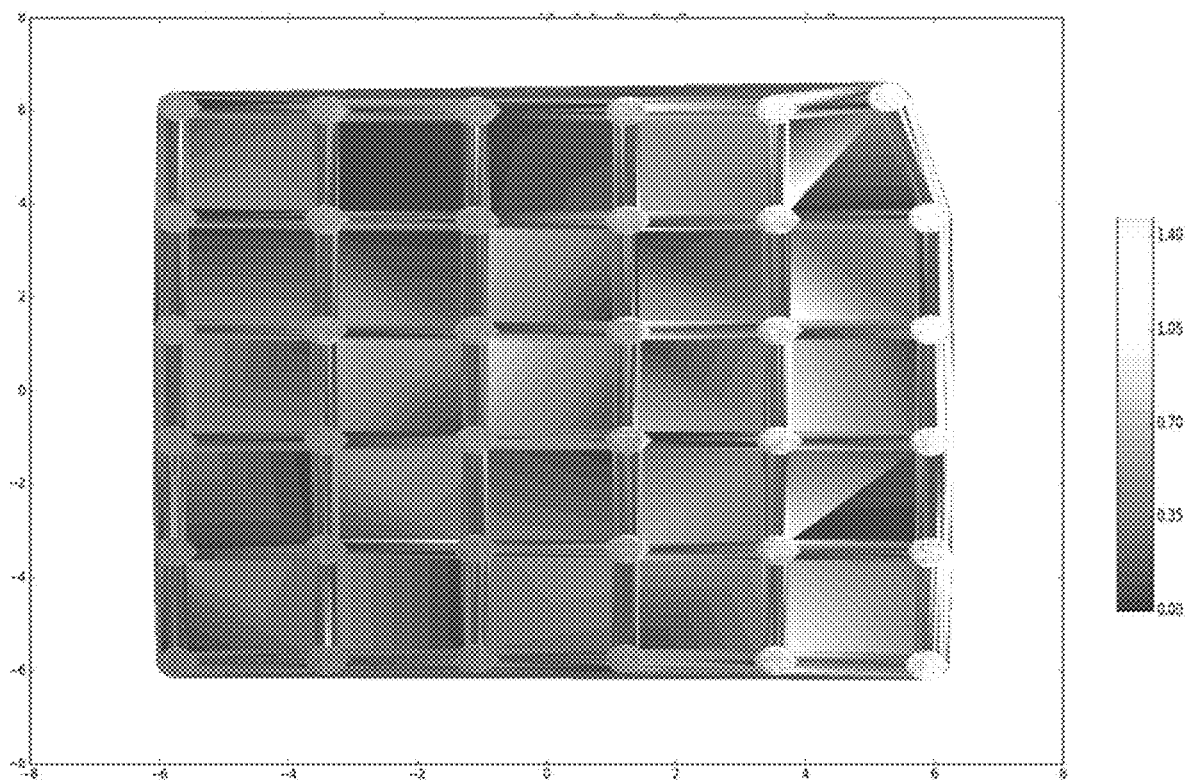

FIGS. 5A-5C each show a top view of a build plane that includes a number of workpieces 502. Each of the build planes are shaded to show variations in signal readings recorded by three sensor devices 202 of a sensor assembly 200 arranged in a configuration similar to the configuration shown in FIG. 2. FIG. 5A can correspond to sensor device 202-1, FIG. 5B can correspond to sensor device 202-2 and FIG. 5C can correspond to sensor device 202-3. As shown, sensor readings emitted from a right side of the build plane are substantially higher in FIG. 5C than in FIGS. 5A and 5B. This can be indicative of a potential problem in the manufacturing process and may be due to sensor device 202-3 being closer to the right side of the build plane than the other sensor devices or due to the right side of the build plane being partially obscured from sensor devices 202-1 and 202-2. In such a case, further analysis may be warranted for the parts built on the right side of the build plane.

Figure 5D:
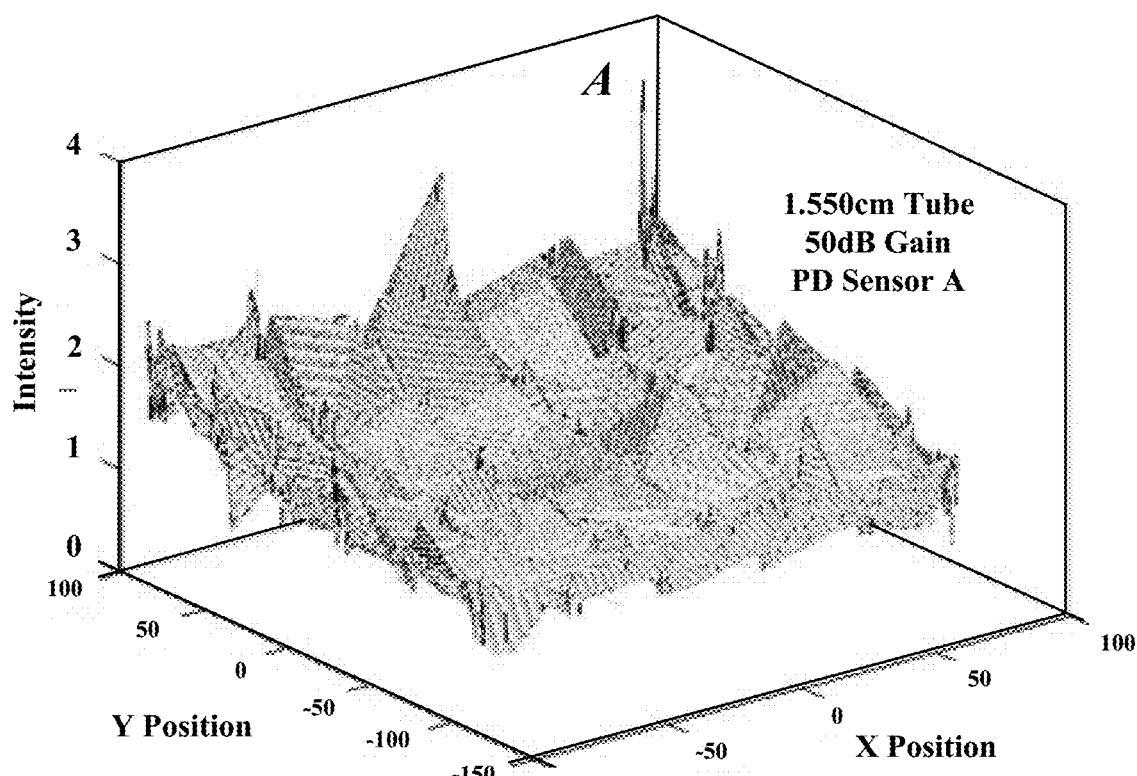
FIGS. 5D-5G each show a contour graph illustrating the intensity of light being emitted from the build plane.
Figure 5E:
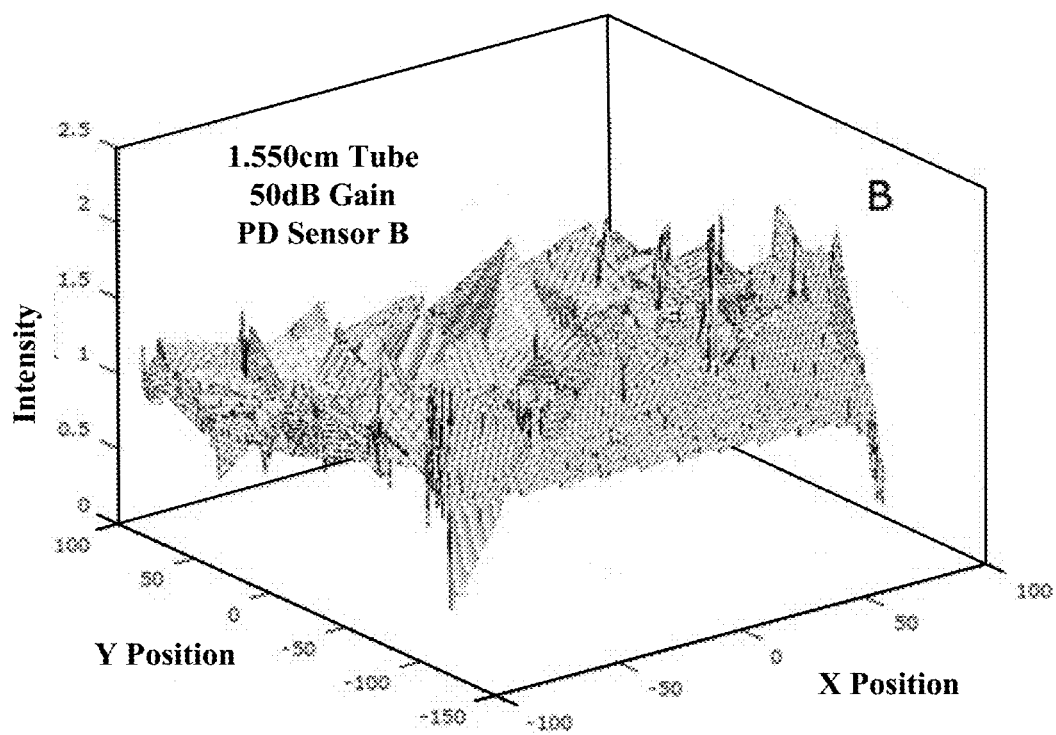
Figure 5F:
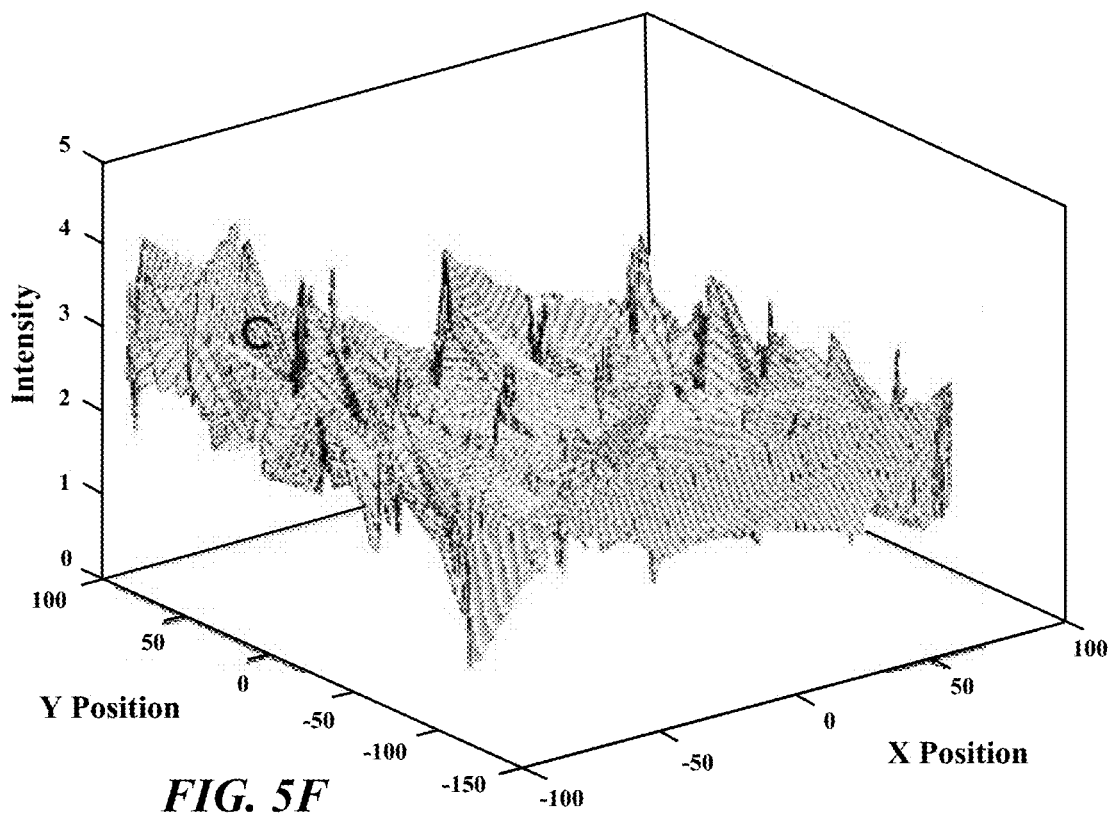
Figure 5G:
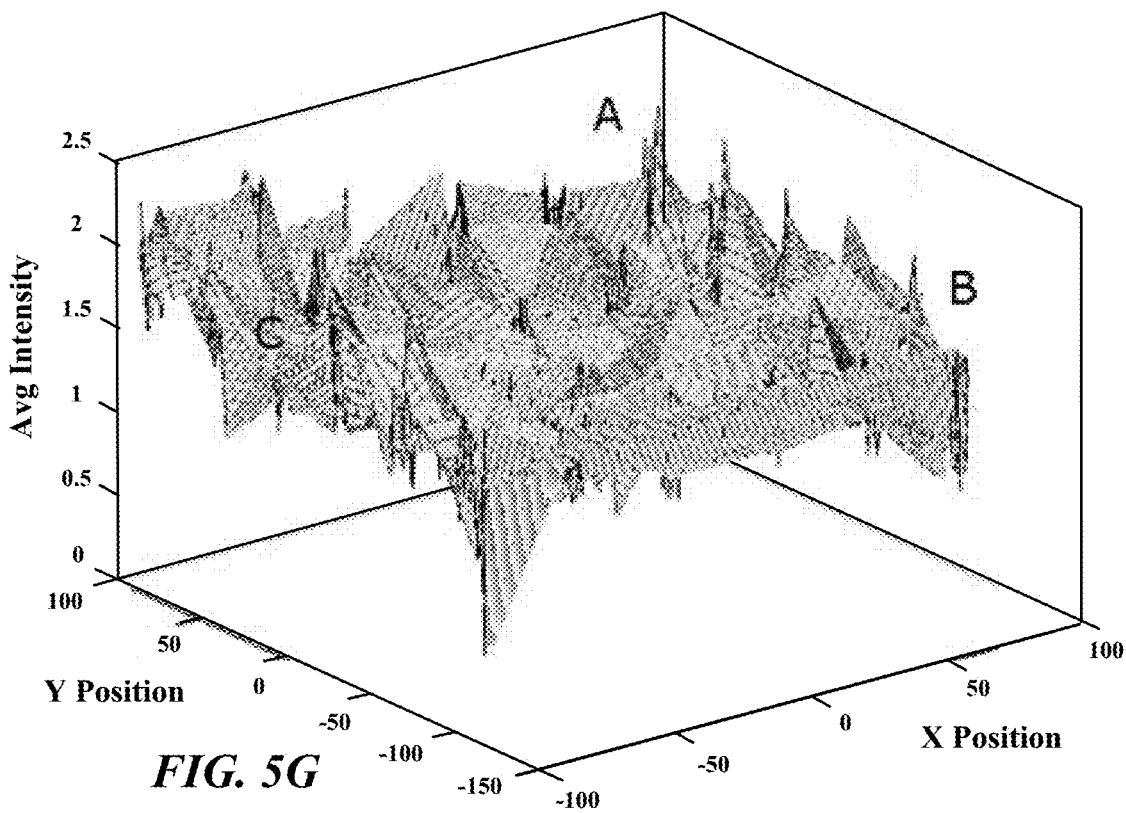
Figure 6:
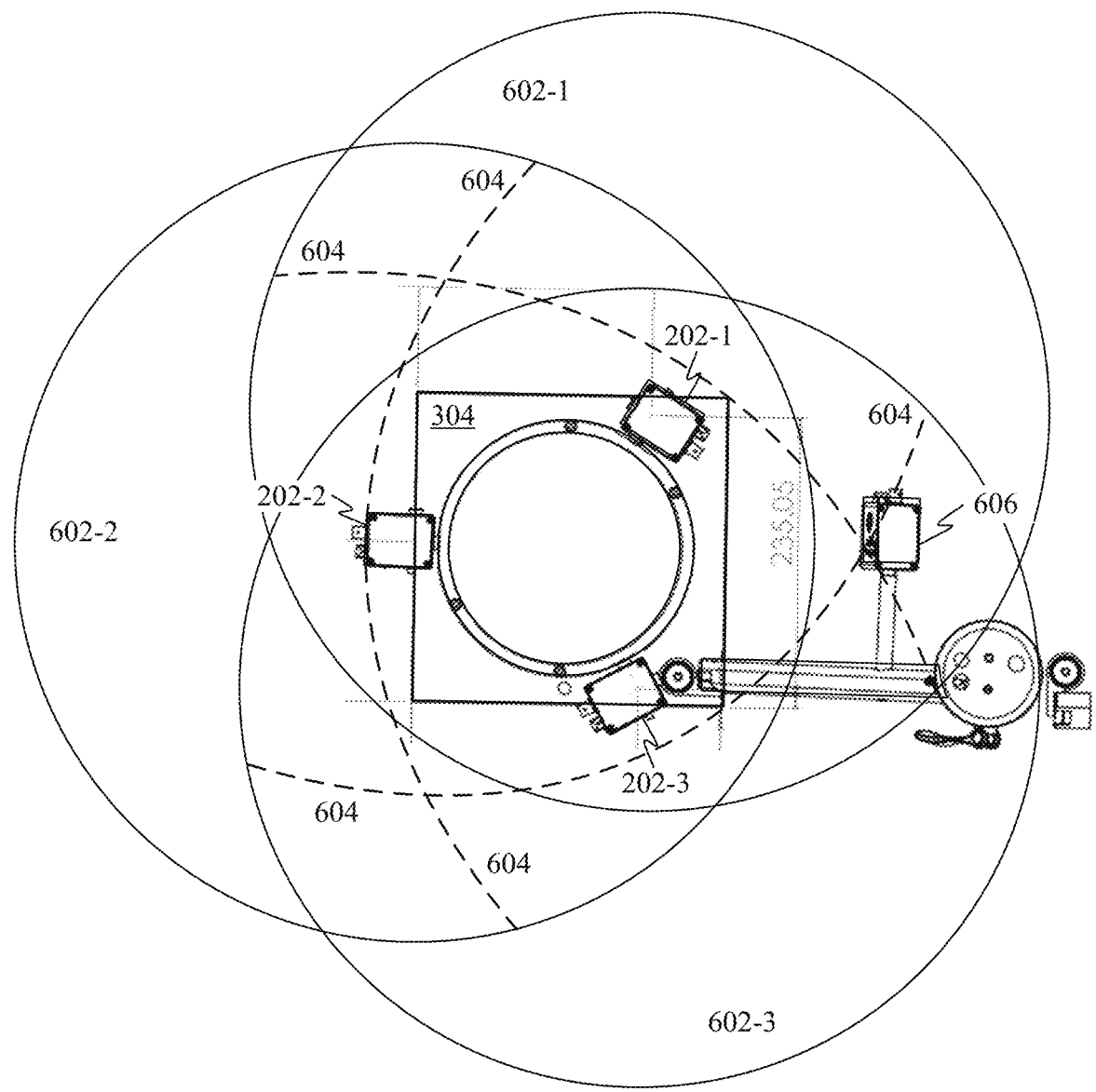
FIG. 6 shows a top view of an alternative additive manufacturing system that includes sensor devices oriented directly toward the build plane.

FIGS. 5D-5G show three dimensional representations of another manufacturing operation as recorded by three photodetectors gathering intensity information. The depicted sensor readings were collected while building 36 different parts across the build plane. FIG. 5D can correspond to sensor device 202-1, FIG. 5E can correspond to sensor device 202-2 and FIG. 5F can correspond to sensor device 202-3. FIGS. 5D-5F illustrate how the different positions of the sensors can result in portions of the build plane closer to the sensor having slightly elevated sensor readings. FIG. 5G shows readings from sensor devices 202-1, 202-2 and 202-3 averaged together. The averaged responses yield a substantially uniform sensor response across the build plane accounting for variation in position. In some embodiments, in instances where readings from one sensor are substantially different than the readings from the other speakers the out of bounds reading can be discarded for purposes of real-time analysis. Post-analysis could involve FIG. 6 shows a top view of an alternative additive manufacturing device 600 that includes sensor devices 202 oriented directly toward the build plane. This results in fields of view 602-1, 602-2 and 602-3 extending off of build plane 304 in a variety of different directions. However, by adding elliptical baffles to each of sensor devices 202 a field of view of sensor devices 202 can be limited primarily to build plane 304. Dashes lines 604 show how the elliptical baffles can narrow broad fields of view 602 to an area extending just outside of build plane 304. In this way, sensor devices 202 can be oriented at an angle normal to build plane 304 without being susceptible to detecting heat signatures positioned a large distance from build plane 304. FIG. 6 also shows additional sensor device 606, which is positioned farther off axis and can collect different types of data. For example, sensor device 606 could be a high-speed imaging device that follows and tracks the position of a beam emitted by the energy source as it scans across build plane 304.

Figure 7A:
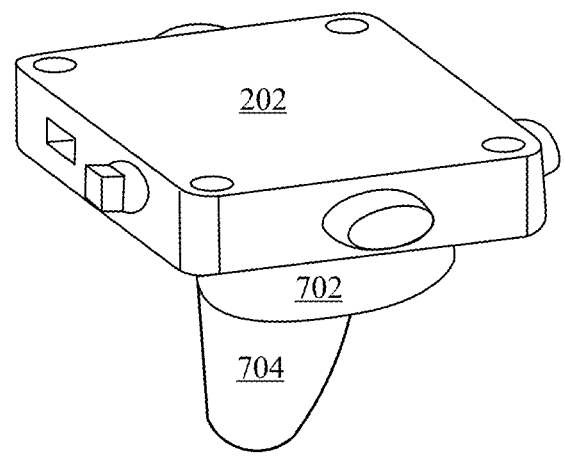
FIG. 7A shows an exemplary sensor device with elliptical baffles.
Figure 7B:
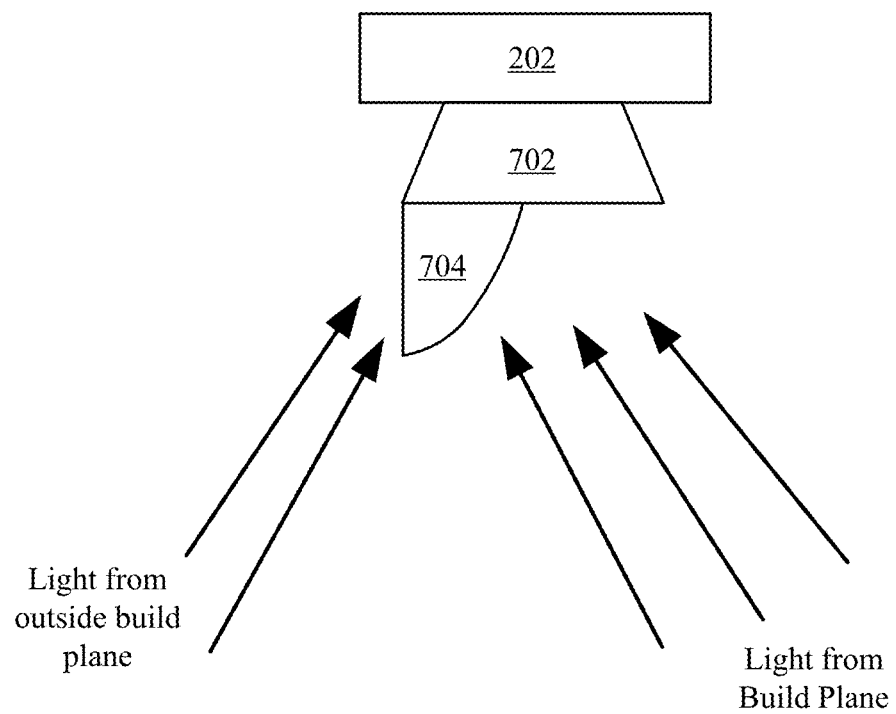
FIG. 7B shows how elliptical baffles are able to block light originating from outside the build plan.

FIG. 7A shows an exemplary sensor device 202 with elliptical baffles 704. Elliptical baffles 704 can be configured to block light from being received into optics 702 and an imaging or non-imaging sensor within sensor device 202. FIG. 7B shows how elliptical baffles 704 are able to block light originating from outside the build plane while allowing light to enter optics 702 that originate from the build plane. In some embodiments a length of elliptical baffles 704 can be increased to discourage reflection of light off of walls of a build chamber of an additive manufacturing system. While increasing the length of the baffles can reduce the amount of light received, the enlarged baffles help to limit the light received to readings originating directly from the build plane, thereby improving the accuracy of the sensor readings.

Figure 7C:
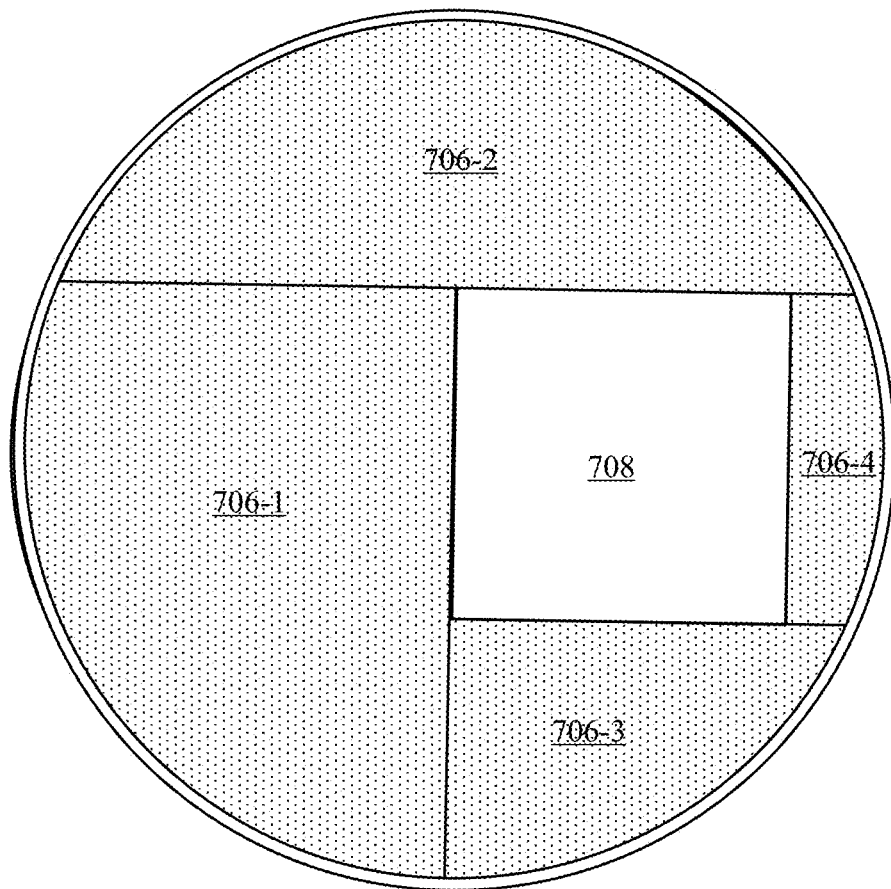
FIG. 7C shows a front view of sensor device optics, covered by a mask that covers a portion of an entry aperture leading into the optics.

FIG. 7C shows a front view of optics 702, covered by a mask 706 that covers a portion of an entry aperture leading into optics 702. Opening 708 can be sized and positioned to match a corresponding build plane so that only the light originating from the build plane is able to enter optics 702. In some embodiments, mask 706 can be a single piece that snaps over or is otherwise coupled to a light receiving end of optics 702. In other embodiments, mask 706 can be made of multiple strips of material, 706-1 to 706-4 that cooperatively define aperture 708. Material strips 706-1 to 706-4 are depicted as being rectangular in shape but could also have other shapes. Similarly opening 708 could have any other shape as well that corresponds to a region of the build plane associated with a particular energy source. In some embodiments, mask 706 can be utilized in conjunction with the aforementioned elliptical baffle configurations. For example, mask 706 could be affixed to an end of a tube extending off the end of optics 702 and mask 706 could be placed over a distal end of the tube.

Figures 8A, 8B:
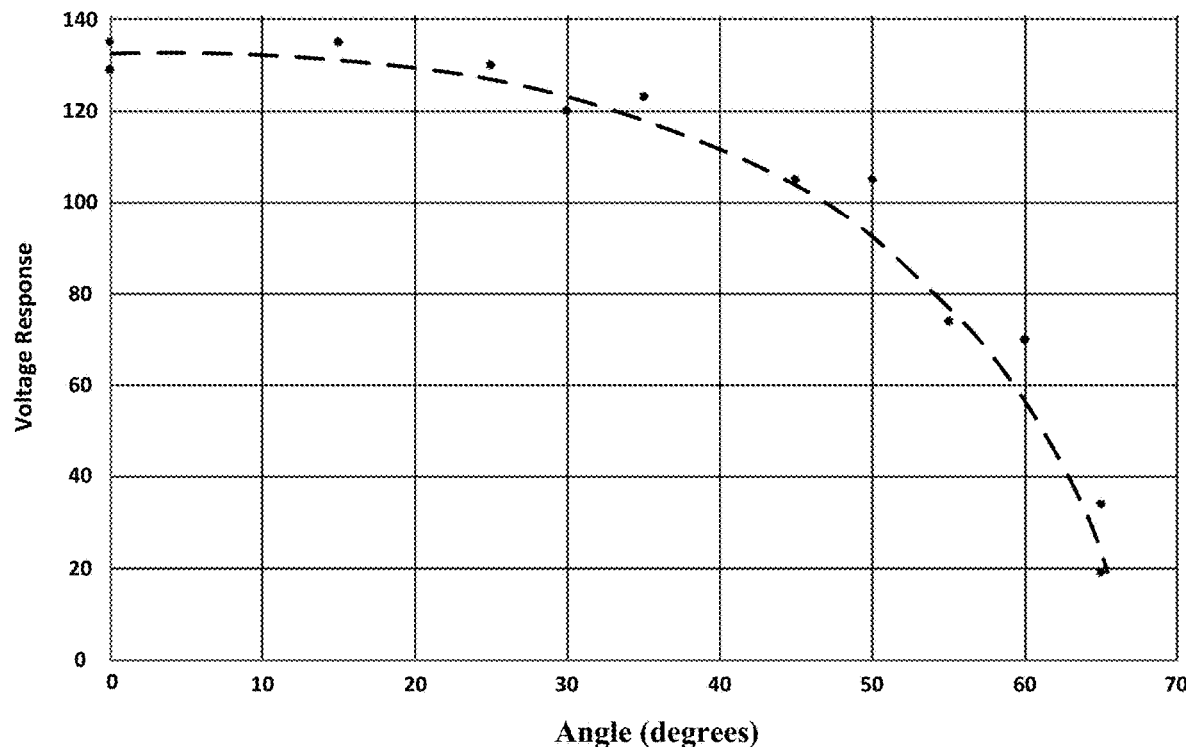
FIGS. 8A-8B show how sensor readings of two photodiodes vary based on an angle between the photodiodes and the light source.

FIGS. 8A-8B show how sensor readings of two photodiodes can vary based on an angle between a sensor device and position from which light is emitted. At zero degrees, where the sensor is pointed directly at the source of light the sensor readings are much higher than when the source is offset 65 degrees from the sensor. FIG. 8B shows how the relationship between signal strength and angle is generally parabolic allowing only minor reductions in signal strength from light arriving from up to 30-45 degrees off axis.

TABLE 1

| Photodiode | Gain | Voltage Response |
|---|---|---|
| A | 10 | 0.111 |
|   | 20 | 0.344 |
|   | 30 | 1.08 |
|   | 40 | 3.90 |
| B | 10 | 0.121 |
|   | 20 | 0.365 |
|   | 30 | 1.15 |
|   | 40 | 3.60 |
| C | 10 | 0.122 |
|   | 20 | 0.375 |
|   | 30 | 1.18 |
|   | 40 | 3.70 |
| D | 10 | 0.121 |
|   | 20 | 0.365 |
|   | 30 | 1.14 |
|   | 40 | 3.60 |

Table 1 above shows how the gain of various sensors can be adjusted to account for any variations in signal strength due to distance or angle between the energy source and a particular sensor. In some embodiments, sensor gain could be adjusted dynamically based on a distance and/or orientation between each sensor device and a region of the build plane receiving energy from the energy source. In this way, sensor readings for each of a number of sensor devices can be kept consistent, thereby improving performance of real-time monitoring of an additive manufacturing process. A position of the energy source can be determined in many different ways. For example, telemetry data from the steerable optics can be used to track position of the energy source as it crosses the build plane. In some cases, a position of the energy source could be determined or confirmed by applying triangulation methods to the multiple sets of intensity data gathered by the sensor devices. A high speed imaging device could also be used to track the position of the energy source as it scans across the build plane.

Exemplary Process Control Types

The following three types of process control can be applied to the processes described herein. First, Process Intervention, or the stopping or interruption of a process for cause based on one or more critical process features going out of a specified range Second, Interlayer process control, or the alteration of process parameters between layers in an additive manufacturing process based on measurements made during the previous layer, quality or feature metrics calculated from such measurements, and a decision algorithm which decides if these features are within specified ranges and if they are not then how to make adjustments to process parameters such as energy source power and travel speed to get one or more part quality metrics back into their specified ranges. The third type of process control that can be applied is Intra-layer, or scan-level process control, in which power, travel speed or other process parameters could be changed so that certain quality metrics or features will remain within specified ranges.

The third form of process control is the fastest and requires the fastest control loop. The first form of process control may be viewed as an open loop control with only one outcome, i.e. the process is halted when conditions are seen to drift too far from nominal. The second form is a slower form of real time control and only adjusts parameters on a layer by layer basis.

Figure 9:
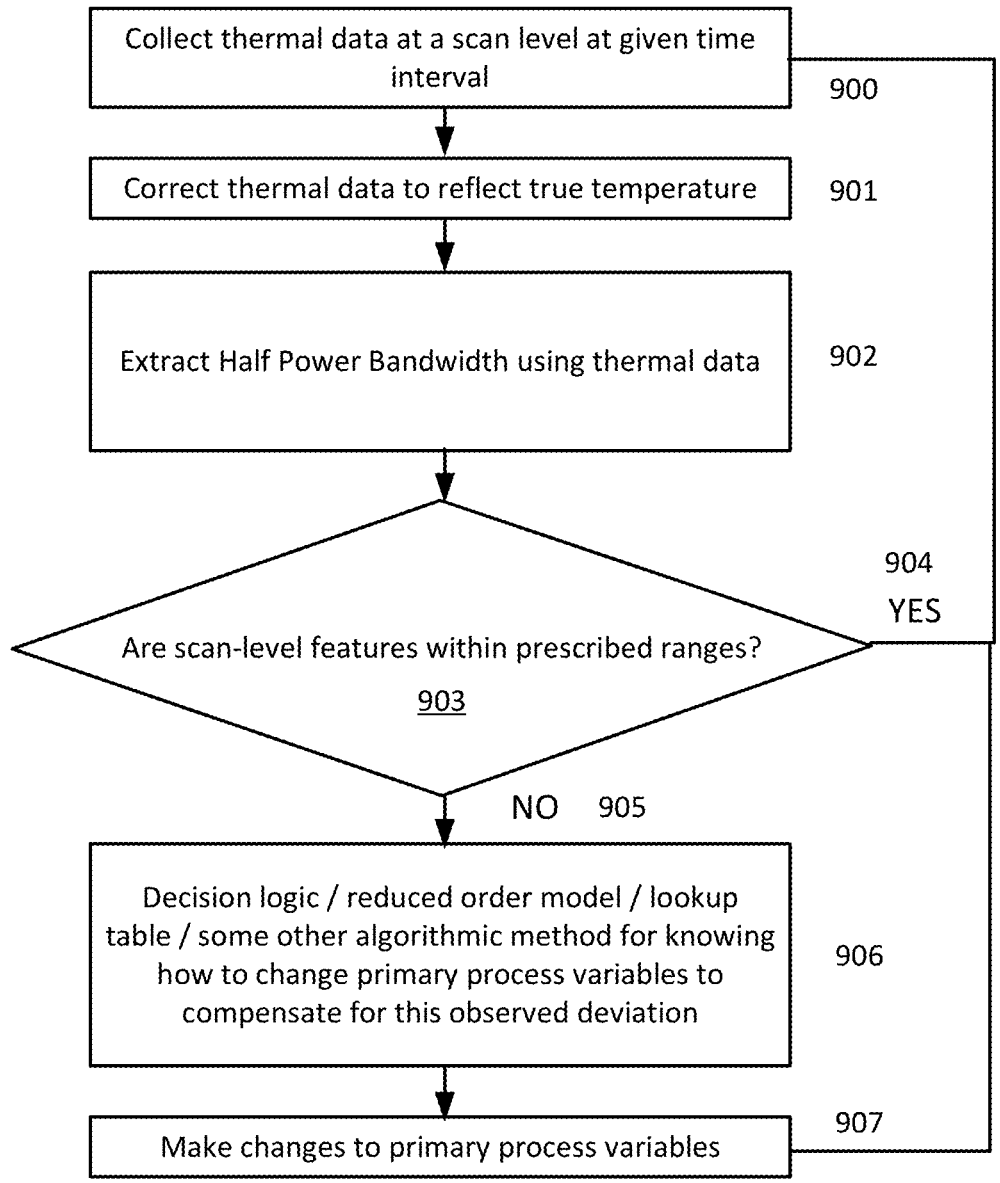
FIG. 9 shows a high level process control flow chart.

FIG. 9 shows a high level process control flow chart which utilizes the process features discussed previously. This diagram shows the process flow for the case of intra-layer or scan by scan control. In such control, a single scan is conducted, calculations are made, and if necessary adjustments are made prior to the next scan. This is therefore envisioned as a fast control loop which makes changes in a millisecond or potentially less. At 800 thermal measurements are taken using one or more Eulerian sensors. In some embodiments, the thermal measurements are received as voltage data. At 901 the thermal measurements can be corrected to reflect a true temperature. At 902, features are extracted and could include, but are not limited to, such features as the energy density, peak temperature, etc. These are features that have metallurgical significance for the material and the as-deposited additive manufacturing buildup.

Then at 903, it is seen whether or not these features are within the prescribed ranges that are known to correspond to nominal process behavior and are known to produce acceptable parts. If the answer is yes, then at 904 the process continues to the next scan with the same process variables/ process parameters. Note that there could be hundreds or thousands of scans within a single layer of an additive manufactured part, and there could be thousands of such layers per part. If the result of the query posed in 903 is no, then at 905 the process flow is diverted to a decision at 906. At 906, some methodology that can make a decision based on the magnitude and direction of the deviations observed is applied. This decision logic could be a reduced order process model, or it could be a lookup table or database, or it could be some heuristic scheme like a neural network, or it could be any other algorithmic system that decides which process variables or process parameters to change, by how much, and in which direction (increase or decrease). For example, a change in process variables or process parameters can take the form of changes to the energy source heat output power, travel speed and scan pattern, which can alter the amount of energy introduced to one or more layers of a part.

Then at 907 these new process parameters are utilized to make the next scan based on the data provided by the previous scan, and the process is repeated until the layer and ultimately the part is completed. Generally, increases in power and decreases in energy source travel speed result in greater amounts of heat being added to the part. By adding greater amounts of heat, the solidification rate actually decreases. So, to fix a condition in which solidification is occurring too rapidly, additional heat can be added to the system. Conversely, if solidification of the materials are happening too slowly, then an amount of energy delivered to the part can be reduced, which increases the rate at which solidification occurs. Generally speaking, the rate at which the material solidifies is quite important as cooling rates too far out of bounds tend to degrade the quality of the finished part. Another way to adjust the amount of heat delivered to a particular layer or area is by adjusting the scan pattern. For example, a scan pattern with passes grouped closely together would deliver relatively more heat to the part than another laser otherwise using the same settings but with a broader scan pattern.

Figure 10:
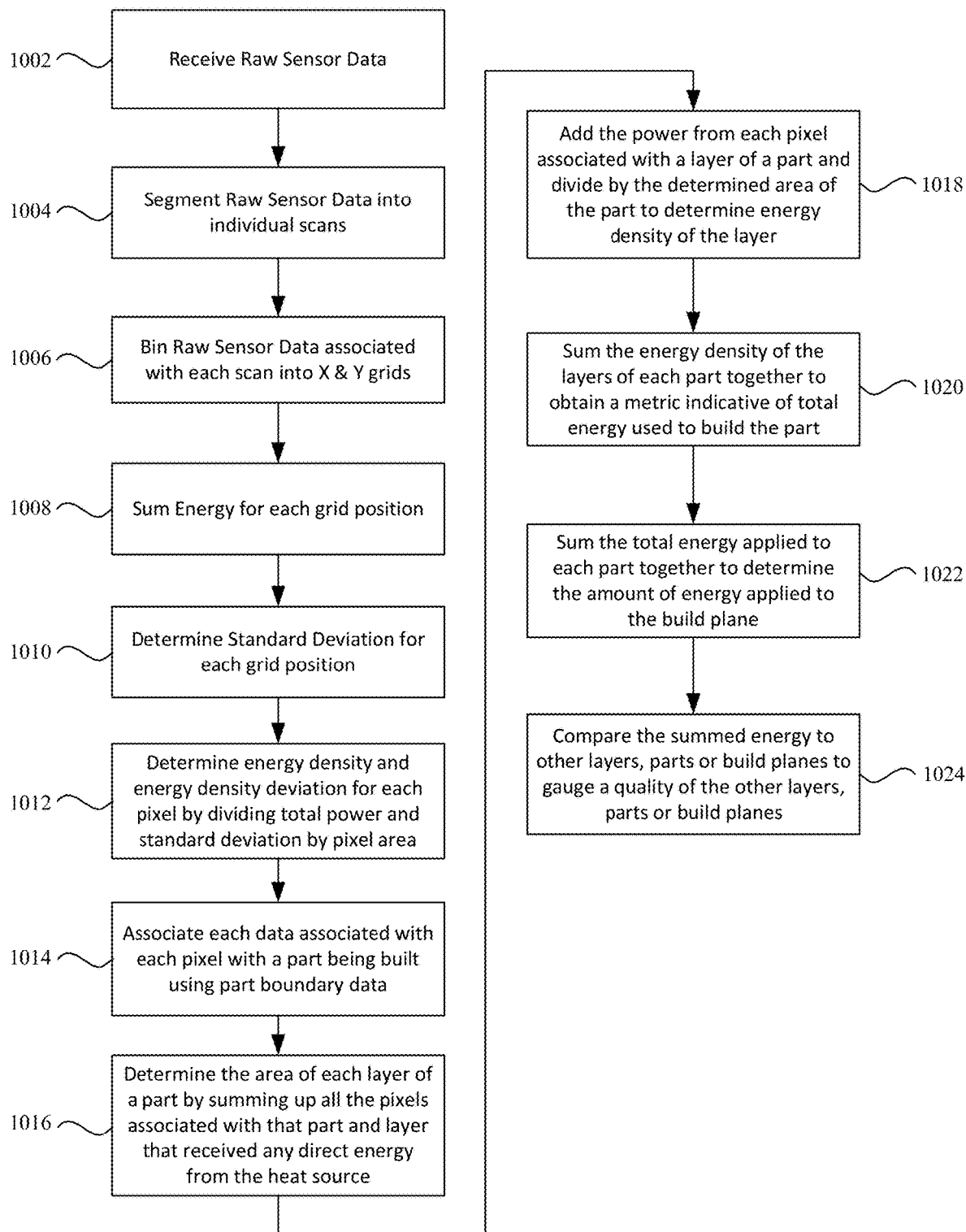
FIG. 10 shows a process in which data recorded by an optical sensor such as a non-imaging photodetector can be processed to characterize an additive manufacturing build process.

FIG. 10 shows a process in which data recorded by an optical sensor such as a non-imaging photodetector can be processed to characterize an additive manufacturing build process. At 1002, raw sensor data is received that can include both build plane intensity data and energy source drive signals correlated together. At 1004, by comparing the drive signal and build plane intensity data, individual scans can be identified and located within the build plane. Generally the energy source drive signal will provide at least start and end positions from which the area across which the scan extends can be determined. At 1006, raw sensor data associated with an intensity or power of each scan can be binned into corresponding X & Y grid regions. In some embodiments, the raw intensity or power data can be converted into energy units by correlating the dwell time of each scan in a particular grid region. Each grid region can have a size corresponding to one or more pixels of an optical sensor monitoring the build plane. It should be noted that different coordinate systems, such as polar coordinates, could be used to store grid coordinates and that storage of coordinates should not be limited to Cartesian coordinates. In some embodiments, different scan types can be binned separately so that analysis can be performed solely on particular scan types. For example, an operator may want to focus on contour scans if those types of scans are most likely to include unwanted variations. At 1008, energy input at each grid region can be summed up so that a total amount of energy received at each grid region can be determined using equation (1).

$$E_{pd_m} = \sum_{n=1}^{pixel\ samples\ in\ grid\ cell} E_{pd_n} \qquad (1)$$

This summation can be performed just prior to adding a new layer of powder to the build plane or alternatively, summation may be delayed until a predetermined number of layers of powder have been deposited. For example, summation could be performed only after having deposited and fused portions of five or ten different layers of powder during an additive manufacturing process. In some embodiments, a sintered layer of powder can add about 40 microns to the thickness of a part; however this thickness will vary depending on a type of powder being used and a thickness of the powder layer.

At 1010, the standard deviation for the samples detected and associated with each grid region is determined. This can help to identify grid regions where the power readings vary by a smaller or greater amount. Variations in standard deviation can be indicative of problems with sensor performance and/or instances where one or more scans are missing or having power level far outside of normal operating parameters. Standard deviation can be determined using Equation (2).

$$E_{pd_{sm}} = \sqrt{\frac{1}{\#\ sample\text{-}in\text{-}location - 1} \sum_{n=1}^{sample\text{-}in\text{-}pixel} (E_n - \bar{E})^2} \qquad \text{Eq. (2)}$$

At 1012, a total energy density received at each grid region can be determined by dividing the power readings by the overall area of the grid region. In some embodiments, a grid region can have a square geometry with a length of about 250 microns. The energy density for each grid region can be determined using Equation (3).

$$E_{grid\ location} = \frac{\sum_{n=1}^{samples\text{-}in\text{-}location} E_{pd_n}}{A_{grid\ location}} \qquad \text{Eq. (3)}$$

At 1014, when more than one part is being built, different grid regions can be associated with different parts. In some embodiments, a system can included stored part boundaries that can be used to quickly associate each grid region and its associated energy density with its respective part using the coordinates of the grid region and boundaries associated with each part.

At 1016, an area of each layer of a part can be determined. Where a layer includes voids or helps define internal cavities, substantial portions of the layer may not receive any energy. For this reason, the affected area can be calculated by summing only grid regions identified as receiving some amount of energy from the energy source. At 1018, the total amount of power received by the grid regions within the portion of the layer associated with the part can be summed up and divided by the affected area to determine energy density for that layer of the part. Area and energy density can be calculated using Equations (4) and (5).

$$A_{part} = \sum_{n=1}^{part\ pixel} 1(E_{pd_n} > 0) \qquad \text{Eq. (4)}$$

$$IPQM_{part_{layer}} = \frac{\sum_{n=1}^{part\ grid\ locations} E_{pd_n}}{A_{part}} \quad \text{Eq. (5)}$$

At 1020, the energy density of each layer can be summed together to obtain a metric indicative of the overall amount of energy received by the part. The overall energy density of the part can then be compared with the energy density of other similar parts on the build plane. At 1022, the total energy from each part is summed up. This allows high level comparisons to be made between different builds. Build comparisons can be helpful in identifying systematic differences such as variations in powder and changes in overall power output. Finally at 1024, the summed energy values can be compared with other layers, parts or build planes to determine a quality of the other layers, parts or build planes.

It should be appreciated that the specific steps illustrated in FIG. 10 provide a particular method of characterizing an additive manufacturing build process according to another embodiment of the present invention. Other sequences of steps may also be performed according to alternative embodiments. For example, alternative embodiments of the present invention may perform the steps outlined above in a different order. Moreover, the individual steps illustrated in FIG. 10 may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 11A:
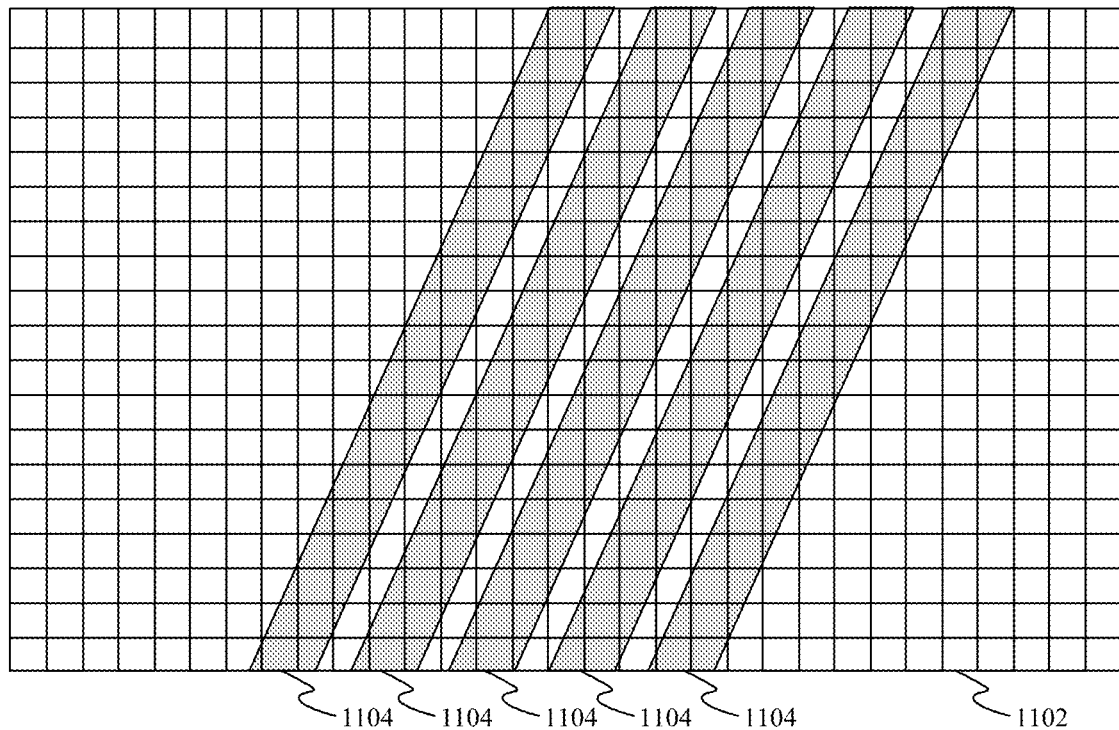
FIGS. 11A-11D show visual depictions indicating how multiple scans can contribute to the power introduced at individual grid regions.

FIGS. 11A-11D show visual depictions indicating how multiple scans can contribute to the power introduced at individual grid regions. FIG. 11A depicts a grid pattern made up of multiple grid regions 1102 distributed across a portion of a part being built by an additive manufacturing system. In some embodiments, each individual grid region can have a size of between 100 and 500 microns; however it should be appreciated that slightly smaller or larger grid regions are also possible. FIG. 11A also depicts a first pattern of energy scans 1104 extending diagonally across grid regions 1102. The first pattern of energy scans 1104 can be applied by a laser or other intense source of thermal energy scanning across grid regions 1102. It should be noted that while energy scans are depicted as having uniform energy density that in some embodiments, the energy density of the scans can instead be modeled using a Gaussian distribution to model the propagation of heat during each energy scan. The Gaussian distribution can be used to more accurately model the distribution of heat within each scan due to the heat being most highly concentrated at the point of incidence between the energy source (e.g. laser or electron beam) and a layer of powder on the build plane and then becoming progressively less intense toward the edges of the scan. By more accurately modeling the beam, grid regions 1102 on the edge of energy scans 1104 are assigned a substantially smaller and more accurate amount of energy while grid regions falling within a central portion of energy scans 1104 are assigned a proportionately larger amount of energy.

Figure 11B:
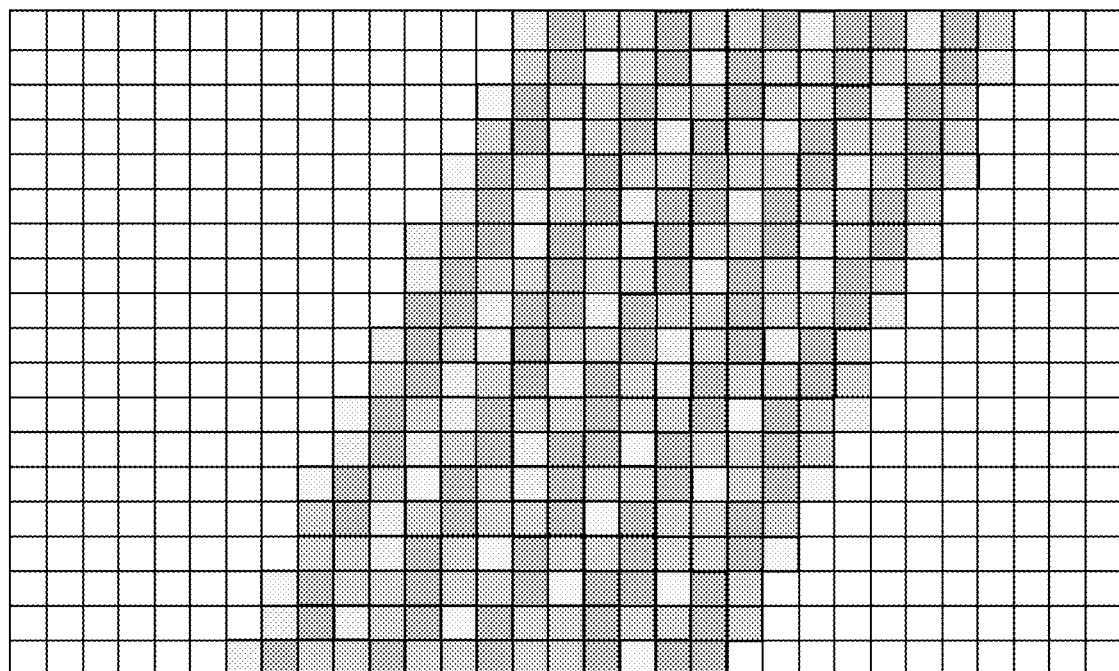

FIG. 11B shows how the energy introduced across the part is represented in each of grid regions 1102 by a singular gray scale color representative of an amount of energy received where darker shades of gray correspond to greater amounts of energy. It should be noted that in some embodiments the size of grid regions 1102 can be reduced to obtain higher resolution data. Alternatively, the size of grid regions 1102 could be increased to reduce memory and processing power usage.

Figure 11C:
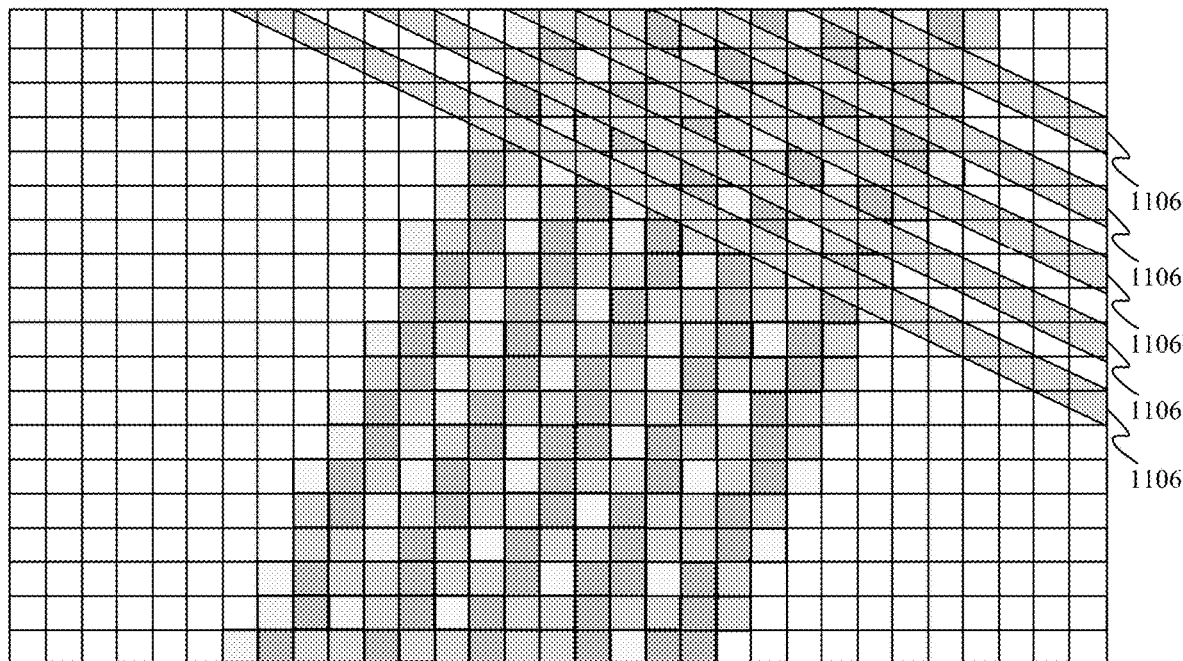
Figure 11D:
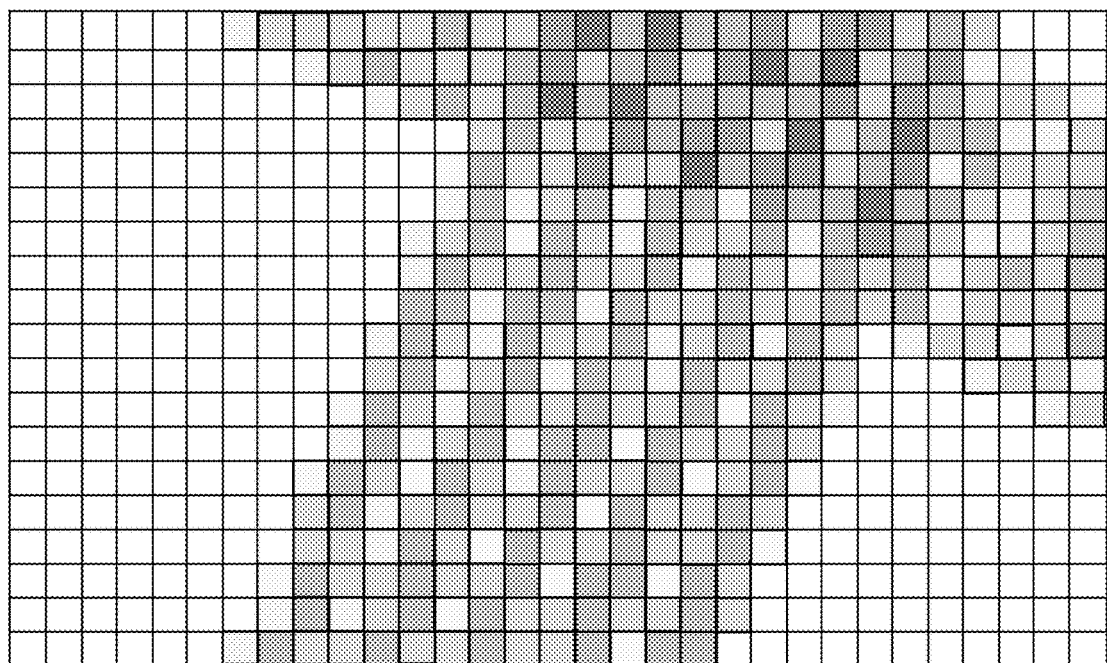

FIG. 11C shows a second pattern of energy scans 1106 overlapping with at least a portion of the energy scans of the first pattern of energy scans. As discussed in the text accompanying FIG. 8, where the first and second patterns of energy scans overlap, grid regions are shown in a darker shade to illustrate how energy from both scans has increased the amount of energy received over the overlapping scan patterns. Clearly, the method is not limited to two overlapping scans and could include many other additional scans that would get added together to fully represent energy received at each grid region.

Figure 12A:
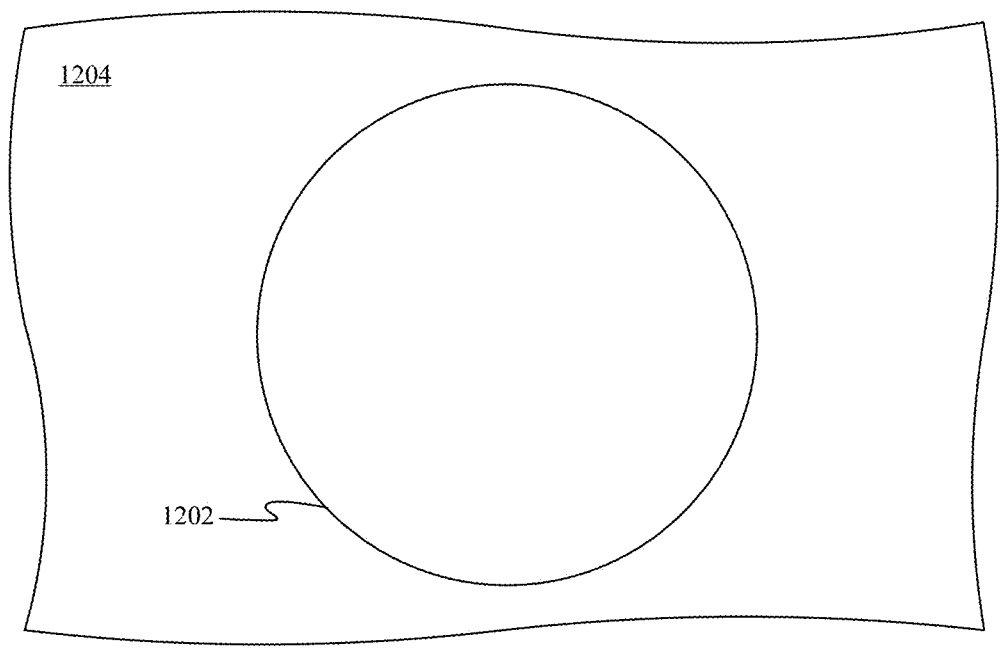
FIGS. 12A-12F illustrate how a grid can be dynamically created to characterize and control an additive manufacturing operation.
Figure 12B:
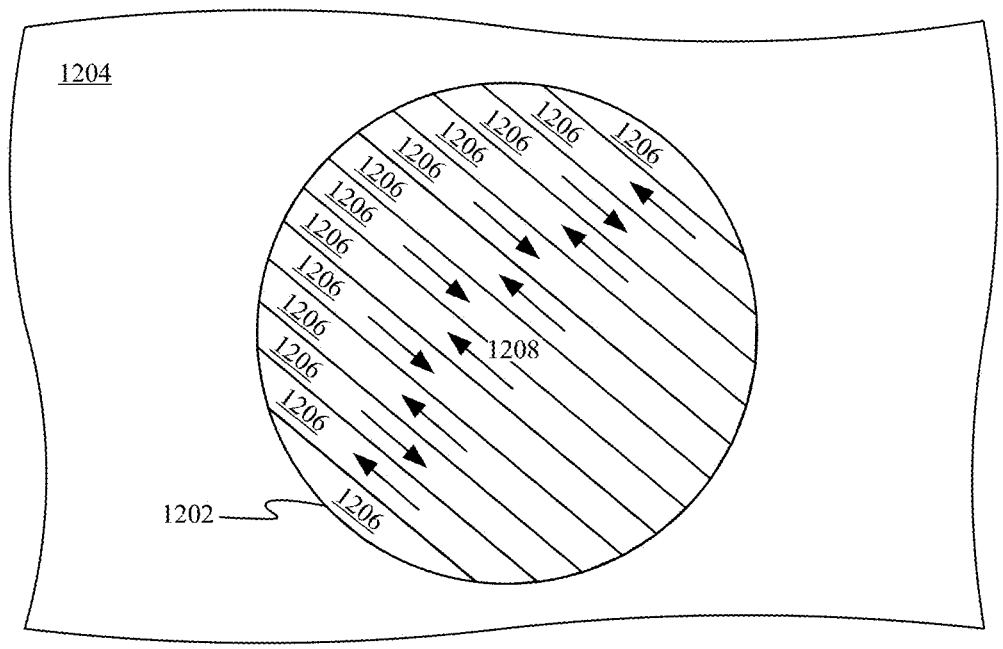

FIGS. 12A-12F illustrate how a grid can be dynamically created to characterize and control an additive manufacturing operation. FIG. 12A shows a top view of a cylindrical workpiece 1202 positioned upon a portion of a build plane 1204. Workpiece 1202 is shown as it undergoes an additive manufacturing operation. FIG. 12B shows how cylindrical workpiece 1202 can be divided into multiple tracks 1206 along which an energy source can melt powder distributed on an upper surface of cylindrical workpiece 1202. In some embodiments, the energy source can alternate directions 1206 as depicted while in other embodiments the energy source can always move in one direction. Furthermore a direction of tracks 1206 can vary from layer to layer in order to further randomize the orientation of scans used to build workpiece 1202.

Figure 12C:
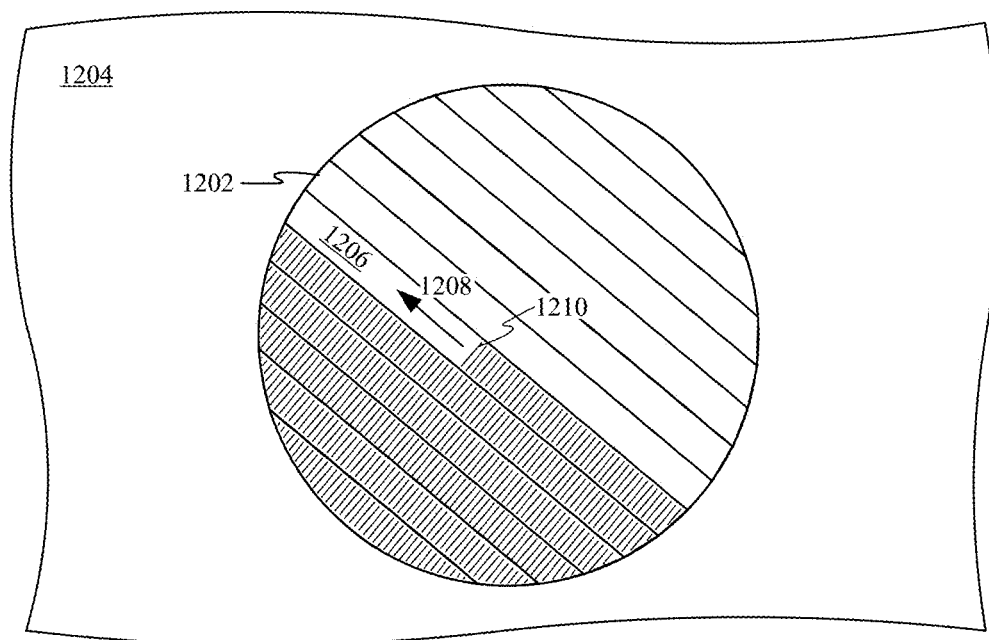

FIG. 12C shows an exemplary scan pattern for the energy source as it forms a portion of workpiece 1202. As indicated, by arrow 1208 a direction of movement of across workpiece 1202 of an exemplary energy source is diagonal. Individual scans 1210 of the energy source can be oriented in a direction perpendicular to the direction of movement of the energy source along track 1206 and extend entirely across track 1206. The energy source can turn off briefly between successive individual scans 1210. In some embodiments, a duty cycle of the energy source can be about 90% as it traverses each of tracks 1206. By employing this type of scan strategy, the energy source can cover a width of track 1206 as it traverses across workpiece 1202. In some embodiments, swath 1210 can have a width of about 5 mm. This can substantially reduce the number of tracks needed to form workpiece 1202 as in some embodiments a width of a melt pool generated by the energy source can be on the order of about 80 microns.

Figure 12D:
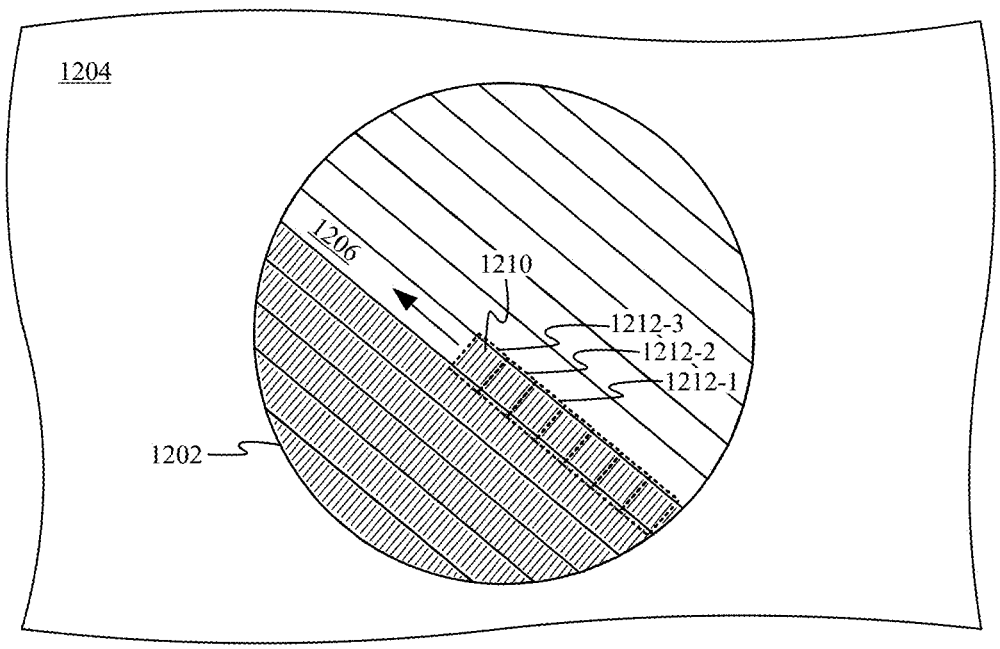
Figure 12E:
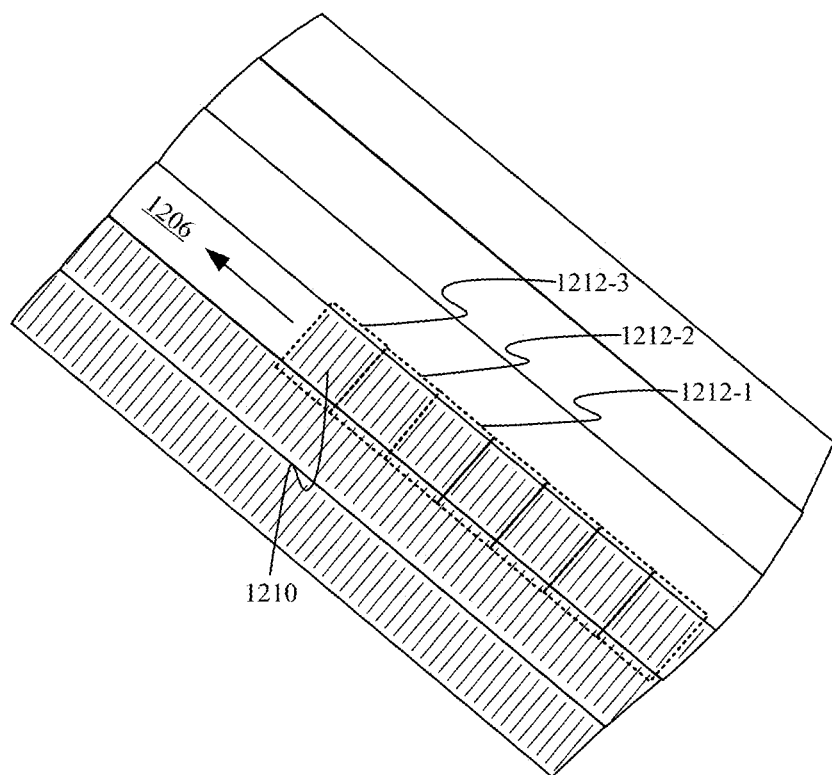

FIGS. 12D-12E show how grid regions 1212 can be dynamically generated along each track 1206 and be sized to accommodate a width of each individual scan 1210. A precise position of subsequent scans can be forecast by the system by referencing energy source drive signals enroute to the energy source. In some embodiments, the width of grids 1212 can match the length of individual scans 1210 or be within 10 or 20% of the length of individual scans 1210. Again, scan length of individual scans 1210 can be anticipated by referencing the energy source drive signals. In some embodiments, grid regions 1212 can be square or rectangular in shape. A thermal energy density can be determined for each of grid regions 1212 as the energy source continues along track 1206. In some embodiments, thermal energy density readings within grid region 1212-1 could be used to adjust an output of the energy source within the next grid region, grid region 1212-2 in this case. For example, if the thermal energy density readings generated by individual scans 1210 within grid region 1212-1 are substantially higher than expected, energy source power output can be reduced, a speed at which energy source scans across individual scans 1210 can be increased and/or spacing between individual scans 1210 can be increased within grid region 1212-2. These adjustments can be made as part of a closed loop control system. While FIG. 12E clearly shows only five individual scans 1210 are shown within each grid region 1212, this is depicted in this manner for exemplary purposes only and the actual number of individual scans within a grid region 1212 can be substantially higher or in some cases lower. For example, where the melt zone generated by the energy source is about 80 microns wide it could take about 60 individual scans 1210 in order for all the powder within a 5 mm square grid region 1212 to fall within the melt zone.

Figure 12F:
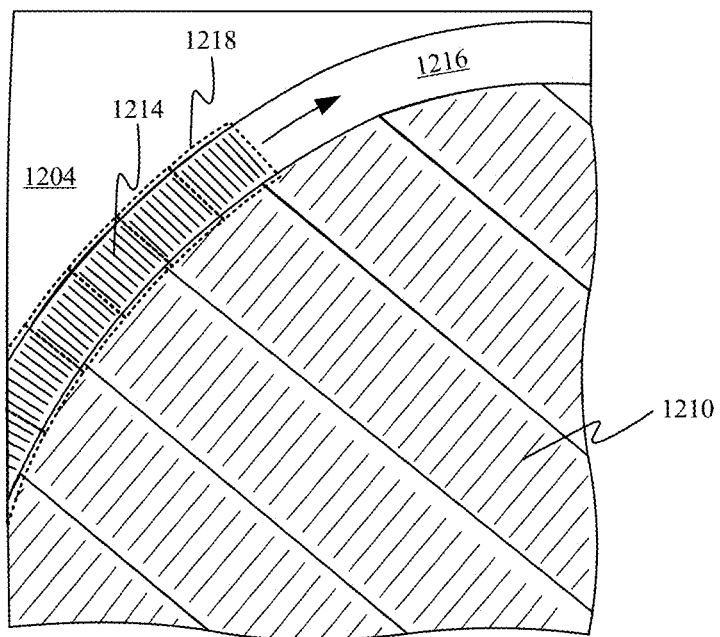

FIG. 12F shows an edge region of workpiece 1202 once the energy source finishes traversing the pattern of tracks 1206. In some embodiments, the energy source can continue to add energy to workpiece 1202 subsequent to a majority of the powder having been melted and resolidified. For example, contour scans 1214 can track along an outer periphery 1216 of workpiece 1202 in order to apply a surface finish to workpiece 1202. It should be appreciated that contour scans 1214 as depicted are substantially shorter than individual scans 1210. For this reason, grid regions 1218 can be substantially narrower than grid regions 1212. It should also be noted that grid regions 1218 are not purely rectangular in shape as in this case they follow the contour of the outer periphery of workpiece 1202. Another instances that may result in scan length differences could be where a workpiece includes walls of varying thickness. A variable thickness wall could result in scans length varying within a single grid region. In such a case, an area of each grid region could be kept consistent by increasing the length of the grid region while narrowing the width to conform to changes in the length of individual scans.

Figure 13:
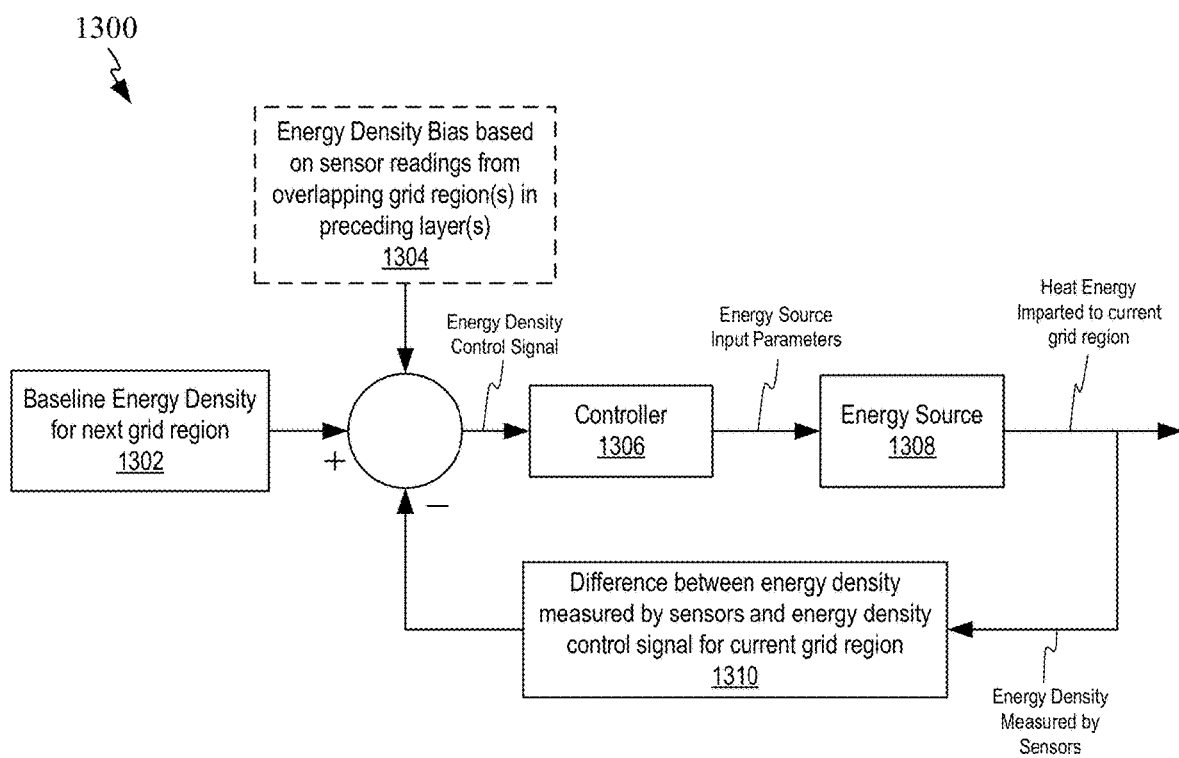
FIG. 13 shows a closed loop control example showing a feedback control loop for establishing and maintaining feedback control of an additive manufacturing operation.

FIG. 13 shows a closed loop control example showing feedback control loop 1300 for establishing and maintaining feedback control of an additive manufacturing operation. At block 1302 a baseline thermal energy density for the next grid region across which the energy source is about to traverse is input into the control loop. This baseline thermal energy density reading can be established from modeling and simulation programs and/or from previously run experimental/test runs. In some embodiments, this baseline thermal energy density data can be adjusted by energy density bias block 1304, which includes energy density readings for various grid regions recorded during preceding layers. Energy density bias block 1304 can include an adjustment to baseline energy density block in instances where preceding layers received too much or too little energy. For example, where optical sensor readings indicate a thermal energy density below nominal in one region of a workpiece, energy density bias values can increase the value of the baseline energy density for grid regions overlapping the grid regions with below nominal thermal energy density readings. In this way, the energy source is able to fuse additional powder that was not fully fused during the preceding layer or layers.

FIG. 13 also shows how the inputs from block 1302 and 1304 cooperatively create an energy density control signal that is received by controller 1306. Controller 1306 is configured to receive the energy density control signal and generate energy source input parameters configured to generate the desired thermal energy density within the current grid region. Input parameters can include power, scan velocity, hatch spacing, scan direction and scan duration. The input parameters are then received by energy source 1308 and any changes in the input parameters are adopted by energy source 1308 for the current grid region. Once optical sensors measure the scans of energy source 1308 making up the current grid region, at block 1310 thermal energy density for the current grid region is calculated and compared to the energy density control signal. If the two values are the same then no change to energy density control signal is made based upon the optical sensor data. However, if the two values are different the difference is added or subtracted from the energy density control signal for scans made in the next grid region.

Figure 14A:
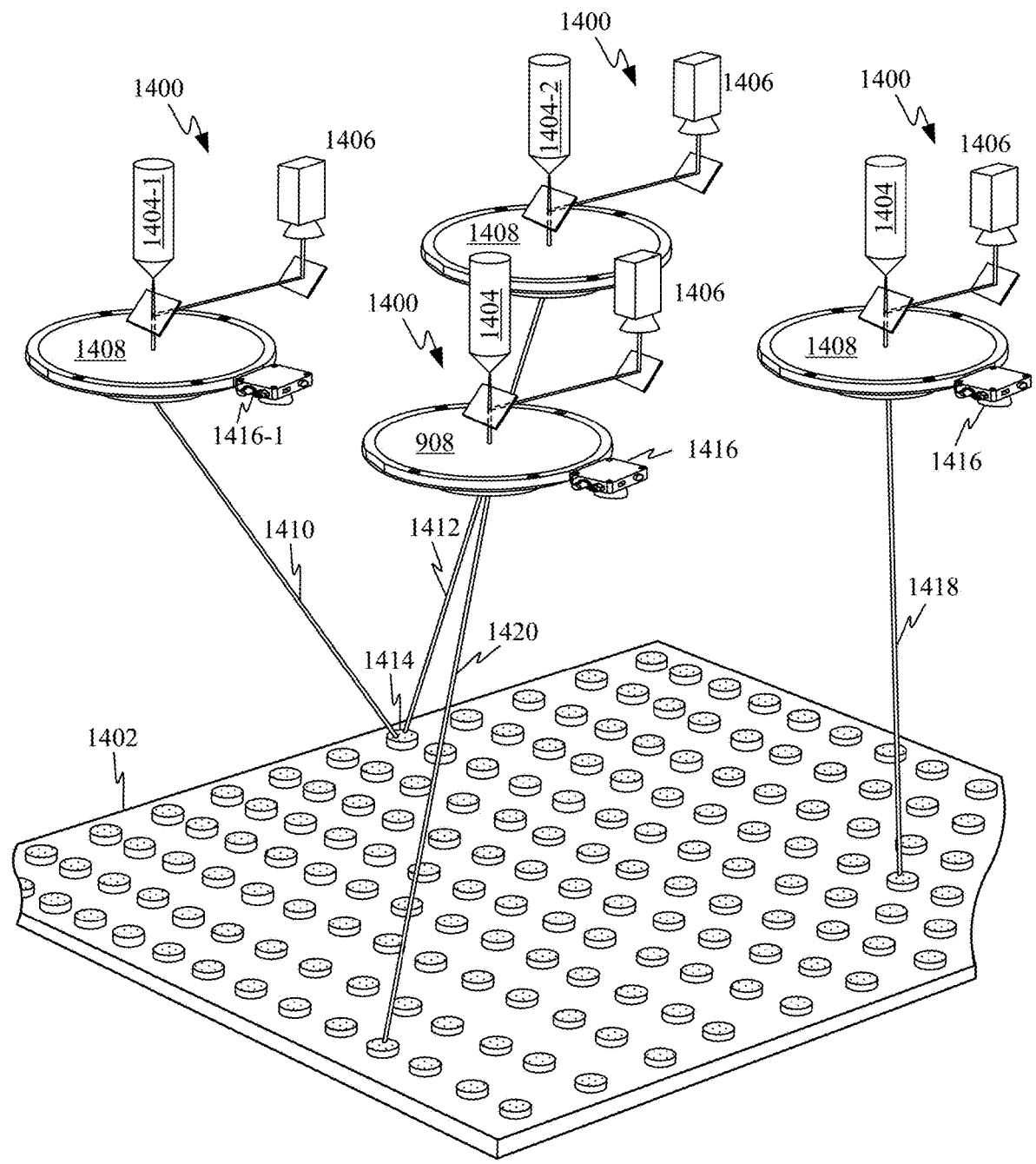
FIG. 14A shows an additive manufacturing system including a single build plane sized to receive energy from multiple energy sources.

Multi-Laser Systems with on Axis Sensor Configurations:

FIG. 14A shows an additive manufacturing system including multiple energy source assemblies 1400 positioned above a single build plane 1402. Each energy source assembly can include an energy sources 1404 that is configured to apply energy to build plane 1402 and an on-axis optical sensor 1406 similar to the on-axis sensor 318 described and depicted in FIG. 3. In particular a sensor field of view of optical sensors 1406 can be between 1cm and 5 cm. In some embodiments, scanning optics 1408 can be shared by associated optical sensors 1406 and energy sources 1404. In some embodiments, energy sources 1404 can be positioned high enough above the build plane configured to allow portions of the coverage area for energy sources 1404 to overlap to an extent that allows at least two of energy sources 1404 to apply energy across an entirety of build plane 1402.

FIG. 14A also shows an embodiment in which energy sources 1404 concurrently emit laser beams 1410 and 1412 to form a part 1414. By applying energy to the same part in this manner a larger amount of energy can be applied to part 1414 at once. In some embodiments, this combination of energy sources can help to achieve a higher peak temperature of the melt pool, which may be helpful for certain metal alloy powders having a high specific heat and/or melt temperature. A combination of energy source inputs can also help to achieve faster scan rates and/or help normalize heat input for locations with greater than average scan angles. For example, since part 1414 is located between energy sources 1404-1 and 1404-2 an angle of incidence between laser beams 1410 and 1412 can be approximately the same and oriented in opposing directions allowing for any biasing in energy due to the scan angle to be normalized. In some embodiments, one or more off-axis optical sensors 1416 can be attached to a periphery of optics 1408. Off-axis optical sensors 1416 can be configured to help determine a total amount of energy being applied to the build plane in cases where energy sources 1404 are determined to be operating in sufficiently close proximity to cause abnormal readings to be detected by on-axis sensors 1406. For example, off-axis sensor 1416-1 can cover a region that includes part 1414 but excludes areas of build plane 1402 being traversed by laser beams 1418 and 1420. In this way, additional information about lasers operating in close proximity can be gathered allowing for a more accurate determination of the total heat output in regions shared by two or more lasers. In particular, total energy output at one of off-axis sensors 1416-1 can be used as a cap for the total amount of radiated energy recorded by overlapping on-axis sensors. In this way, the tendency of the overlapping sensors recording too much applied energy can be at least partially averted. For example, a quick increase in the combined average sensor readings of the overlapping on-axis sensors could be compared to the average sensor readings of the off-axis sensor. A lack of increase in the sensor readings of the off-axis sensor could indicate a problem with the overlapping on-axis sensor data at least partially double counting the radiated heat energy.

Figure 14B:
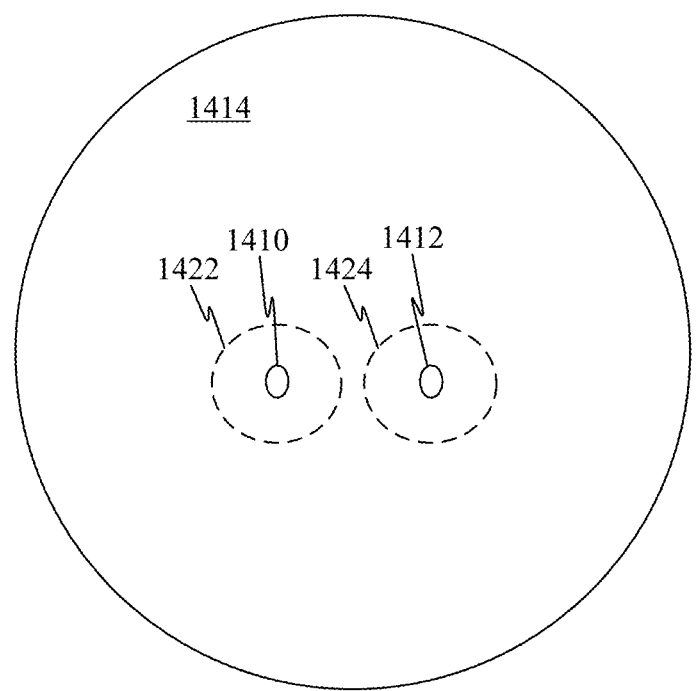
FIGS. 14B-14E show various proximities for lasers and sensor fields of view for the additive manufacturing device depicted in FIG. 14A.

FIGS. 14B-14E show various proximities for lasers and sensor fields of view for the additive manufacturing device depicted in FIG. 14A. FIG. 14B shows a situation in which sensor fields of view 1422 and 1424 associated with on-axis sensors 1406 are applying energy to the same part but are not close enough to have overlapping sensor fields of view. In this embodiment, there would very minor common heat energy radiation sensed by both sensors allowing for little to no problems with overestimating the amount of energy applied to the build plane. Generally, a first energy source will contribute to on-axis sensor readings taken by a second energy source in proximity to the first energy source by elevating an overall background temperature of the part receiving energy. In some embodiments, a processor can be configured to make reductions in the amplitude of sensor readings collected by sensors 1406 in order to help avoid a situation in which sensor readings associated with the first and second energy sources are flagged as potentially out of parameters for being slightly higher than when operating more independently.

Figure 14C:
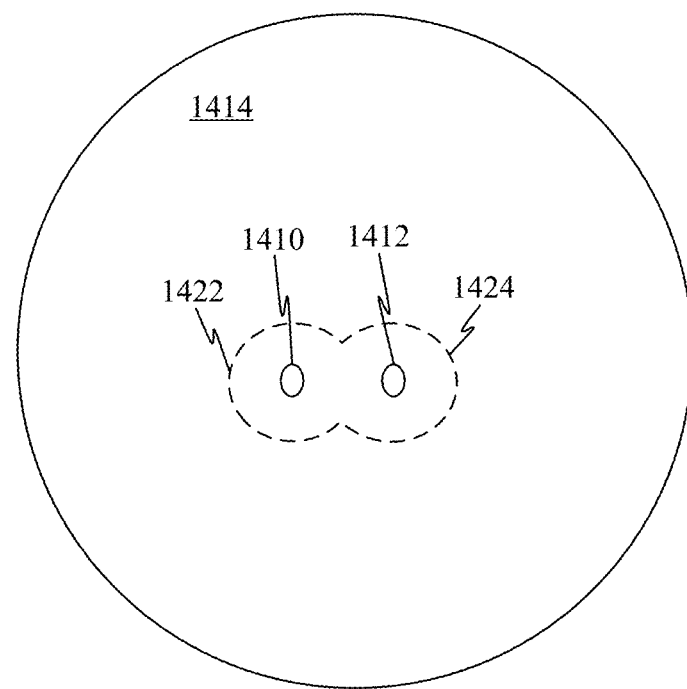
Figure 14D:
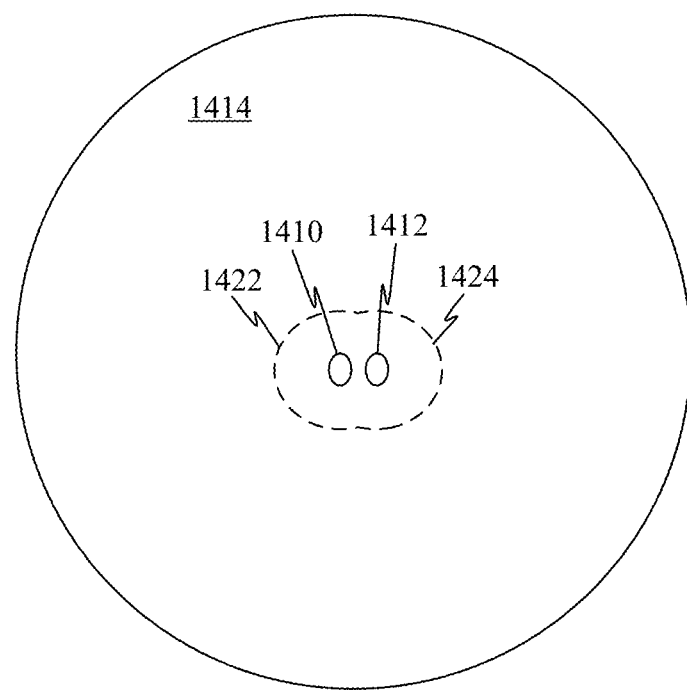

FIGS. 14C and 14D shows a configurations in which sensor fields of view 1422 and 1424 are overlapping to various extents. FIG. 14C shows a slight overlap between sensor fields of view 1422 and 1424. In such a configuration, there is a risk that a portion of the energy radiated by each of the energy sources can be counted more than once. When energy is counted twice this can falsely inflate the amount of energy that is applied to powder on the build plane, thereby reducing the accuracy of the sensor measurements in characterizing changes made to the build plane. This becomes even more problematic when, as shown in FIG. 14D, laser beams 1410 and 1412 are in close enough proximity to cause sensor fields of view 1422 and 1424 to detect a majority of the energy radiated from laser beams 1410 and 1412. When laser beams 1410 and 1412 travel in close proximity for an extended period of time rather than just passing quickly by one another, an approximation can be made to help determine more precisely an amount of energy being radiated as a result of laser beams 1412 and 1410 being incident to powder on the build plane. One simple approximation is to reduce the sensor readings in accordance with the amount of overlapping area of the sensor fields of view 1422 and 1424.

Figure 14E:
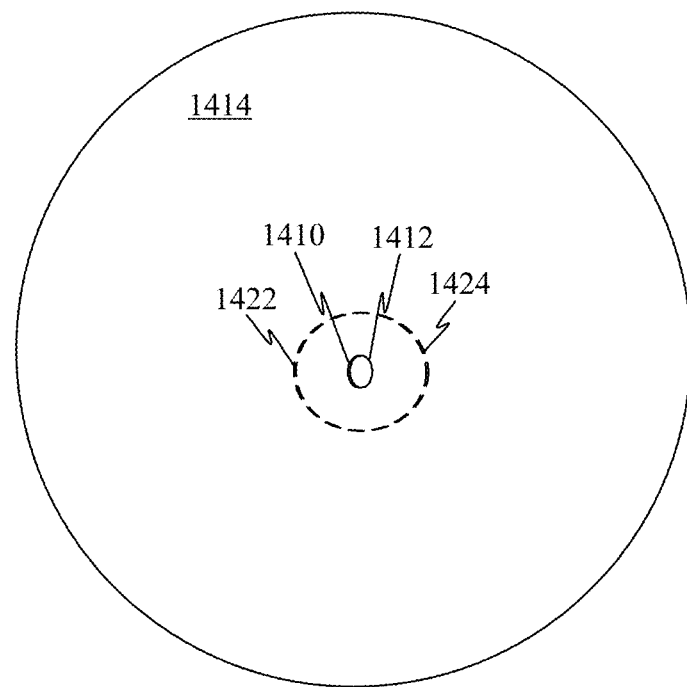

FIG. 14E shows a configuration in which lasers 1410 and 1412 are nearly or entirely overlapping. Such a configuration can be desirable when a greater amount of energy is desirable. In such a case, readings collected by one of sensors 1406 can be ignored as redundant since both sensor fields of view end up covering substantially the same portion of the build plane.

Figure 15A:
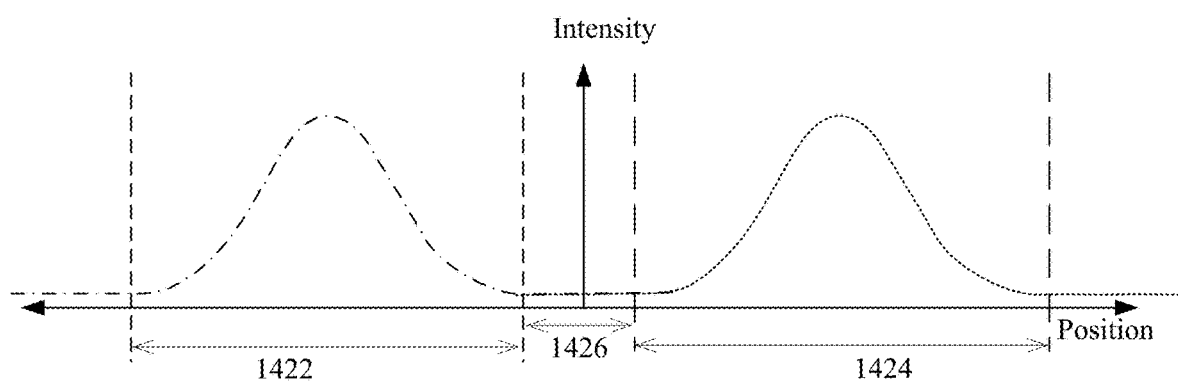
FIG. 15A shows a graph illustrating distributions of heat monitored by two different sensor fields of view in accordance with the configuration depicted in FIG. 14B.

FIG. 15A shows a graph illustrating distributions of heat within sensor fields of view 1422 and 1424 for the configuration depicted in FIG. 14B. In particular, sensor fields of view 1422 and 1424 can be approximated as Gaussian in nature as the amount of energy radiated from within each of the sensor fields of view is at a maximum at the area receiving energy directly from the laser beam and tapers off gradually in an area surrounding the point at which the energy from the laser beam is applied. While direction of travel of the laser beam over time and other factors tend to affect the exact shape of the distribution of heat, a Gaussian distribution is substantially more accurate than assuming the radiated energy is static across sensor fields of view 1422 and 1424. FIG. 15A also shows how increases in background energy overlap is limited to the region 1426 between sensor fields of view 1422 and 1424, which falls outside of sensor fields of view 1422 and 1424. In such a case, the sensor readings of on-axis sensors 1406 may not need to be adjusted at all as any changes would amount merely to a slight rise in the ambient temperature of powder bed 1402.

Figure 15B:
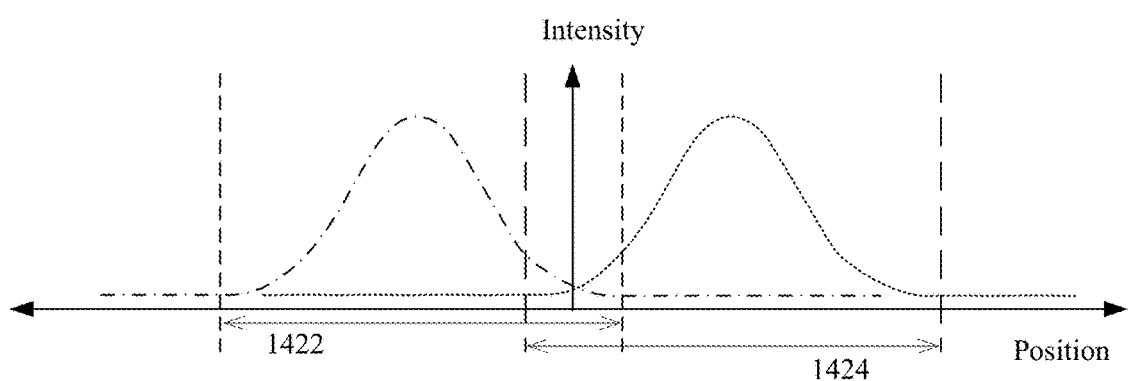
FIG. 15B shows a graph illustrating distributions of heat monitored by two different sensor fields of view in accordance with the configuration depicted in FIG. 14C.

FIG. 15B shows a graph illustrating distributions of heat monitored by two different sensor fields of view in accordance with the configuration depicted in FIG. 14C. In particular, FIG. 15B shows a slight overlap between sensor fields of view 1422 and 1424, potentially resulting in the sensors associated with the sensor fields of view cooperatively monitoring some of the radiated energy twice. In some embodiments, the Gaussian energy distribution can be sued to estimate the amount of radiated energy that is being duplicated and then to reduce the amount of recorded energy for each of the sensors accordingly. Alternatively, when sensors 1406 take the form of a CMOS, CCD or photodiode array type sensor, sensors from portions of the sensors corresponding to the overlapping regions can be ignored to provide a more accurate overall picture of the amount of energy being applied to the build plane by the adjacent lasers 1410 and 1412. For example, optical sensors 1406 could take the form of a 4×4 photodiode array allowing for photodiodes on one side of the photodiode array to be turned off when drive signal data from associated with optics 1408 indicate close proximity between lasers 1410 and 1412. In some embodiments, where interaction between lasers 1410 and 1412 is more transient, such as close passage of the lasers when they are moving in opposing directions, the sensor data can be replaced with extrapolated data based on a model using real-time laser power, scan speed and travel direction parameters.

Figure 15C:
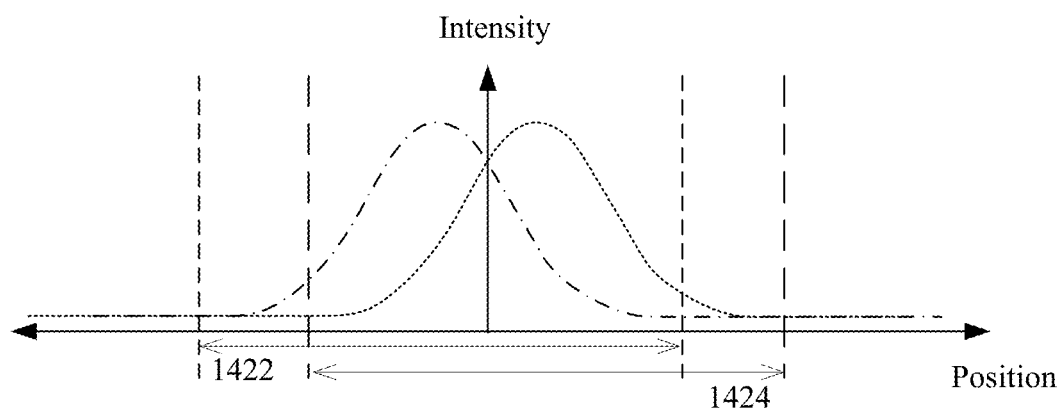
FIG. 15C shows a graph illustrating overlapping sensor fields of view in which both energy sources are within both sensor fields of view.
Figure 15D:
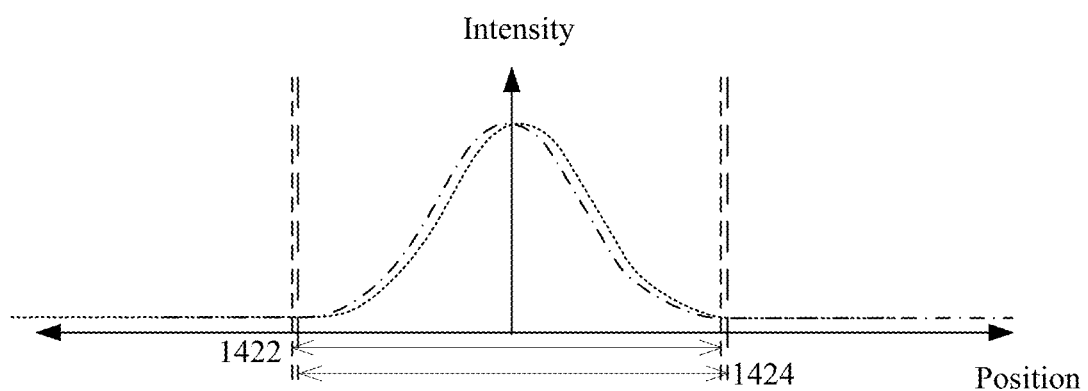
FIG. 15D shows a graph illustrating completely overlapping sensor fields of view.

Similar methods can be utilized with the configuration depicted in FIG. 15C; however it should be appreciated that the larger amount of overlap may make reliance upon a single photodiode more accurate depending upon how much of the sensor field of views overlap. For example, any time a sensor field of view includes both lasers, as depicted in FIG. 15C, a determination of overlap percentage can be calculated and when a threshold such as for example 75% overlap is observed, readings from one of the sensors can be ignored. In FIG. 15D, the sensor providing the most consistent data or the sensor with the lowest angle of incidence to the melt pool could be selected while data from the second sensor could be ignored. It should be noted that in some embodiments, three or more lasers could operate on the same part and sensor readings could be deconflicted in a similar manner.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium for controlling manufacturing operations or as computer readable code on a computer readable medium for controlling a manufacturing line. The computer readable medium is any data storage device that can store data which can thereafter be read by a computer system. Examples of the computer readable medium include read-only memory, random-access memory, CD-ROMs, HDDs, DVDs, magnetic tape, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are

What is claimed is:

1. An additive manufacturing method, comprising:
a build plane having a first region and a second region, wherein the second region at least partially overlaps the first region;
a first additive manufacturing energy source assembly, comprising:
a first energy source configured to direct energy along a first path within the first region of the build plane; and
a first optical sensor having a first sensor field of view configured to follow the first path and to monitor energy radiated from the build plane;
a second additive manufacturing energy source assembly, comprising:
a second energy source configured to direct energy along a second path within the second region of the build plane; and
a second optical sensor having a second sensor field of view configured to follow the second path and to monitor energy radiated from the build plane; and
a processor coupled to the first and the second additive manufacturing energy source assemblies and configured to adjust an output of the first optical sensor and the second optical sensor in response to a distance between the first path and the second path falling below a threshold distance.

2. The method of claim 1 wherein the deconflicting includes reducing at least one of the first and the second sensor readings proportional to an overlap area of the first field of view and the second field of view.

3. The method of claim 1 wherein the deconflicting includes ignoring at least one of the first and the second sensor readings.

4. The method of claim 3 wherein the deconflicting includes determining a first angle of incidence with respect to a melt pool for the first sensor and determining a second angle of incidence with respect to the melt pool for the second sensor and ignoring the sensor having a largest angle of incidence.

5. The method of claim 1 wherein the deconflicting includes adjusting an operation of at least one of the first and the second sensors.

6. The method of claim 5 wherein the first sensor includes a plurality of photodiodes and the adjusting includes disabling one or more photodiodes of the first sensor.

7. The method of claim 1 wherein the deconflicting includes substituting the first sensor reading with a calculated first sensor reading.

8. The method of claim 1 wherein the calculated first sensor reading includes extrapolated data based on a mathematical model of the additive manufacturing system.

9. The method of claim 1 wherein the first and second sensors are optical sensors.

10. The method of claim 1 wherein the first sensor generates the first sensor reading in response to an amount of energy radiated from the build plane within the first field of view.

11. The method of claim 1 wherein the second sensor generates the second sensor reading in response to an amount of energy radiated from the build plane within the second field of view.

12. The method of claim 1 further comprising acquiring a third sensor reading from a third sensor that has a third field of view that is fixed relative to the layer of powder.

13. An additive manufacturing system, comprising:
a build plane including a layer of metallic powder;
a first additive manufacturing energy source assembly, comprising:
a first energy source configured to direct energy along a first path across the build plane; and
a first sensor having a first field of view of the build plane, the first sensor field of view aligned with the first energy source;
a second additive manufacturing energy source assembly, comprising:
a second energy source configured to direct energy along a second path across the build plane; and
a second sensor having a second field of view of the build plane, the second sensor field of view aligned with the second energy source; and
a processor configured to:
receive first data from the first sensor and second data from the second sensor; and
adjust the first data when the first field of view overlaps the second field of view.

14. The additive manufacturing system of claim 13 wherein the adjusting includes the processor modifying the first data proportional to an overlap area of the first field of view and the second field of view.

15. The additive manufacturing system of claim 13 wherein the adjusting includes the processor ignoring the first data.

16. The additive manufacturing system of claim 13 wherein the adjusting includes the processor determining a first angle of incidence for the first sensor and determining a second angle of incidence for the second sensor and ignoring the sensor having a largest angle of incidence.

17. The additive manufacturing system of claim 13 wherein the adjusting includes the processor disabling one or more photodiodes of the first sensor.

18. The additive manufacturing system of claim 13 wherein the adjusting includes the processor replacing the first data with a calculated first data.

19. The additive manufacturing system of claim 18 wherein the calculated first data is extrapolated data based on a mathematical model of the additive manufacturing system.

20. The additive manufacturing system of claim 13 further comprising a third sensor that has a fixed field of view of the build plane and wherein the processor is configured to receive third data from the third sensor.

* * * * *